US011593855B2

(12) United States Patent
Vase et al.

(10) Patent No.: US 11,593,855 B2
(45) Date of Patent: Feb. 28, 2023

(54) SYSTEM AND METHOD FOR COMPUTING FEATURES THAT APPLY TO INFREQUENT QUERIES

(71) Applicant: eBay Inc., San Jose, CA (US)

(72) Inventors: Nadia Vase, Los Altos, CA (US); David Goldberg, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 1945 days.

(21) Appl. No.: 14/984,578

(22) Filed: Dec. 30, 2015

(65) Prior Publication Data
US 2017/0193072 A1 Jul. 6, 2017

(51) Int. Cl.
G06N 20/00 (2019.01)
G06Q 30/0601 (2023.01)
G06F 16/33 (2019.01)
G06N 7/00 (2023.01)

(52) U.S. Cl.
CPC ..... *G06Q 30/0623* (2013.01); *G06F 16/3334* (2019.01); *G06N 7/005* (2013.01); *G06N 20/00* (2019.01)

(58) Field of Classification Search
CPC .......... G06F 17/30663; G06N 99/005
USPC .......................................... 706/46
See application file for complete search history.

(56) References Cited

U.S. PATENT DOCUMENTS

| 8,458,213 | B2 * | 6/2013 | Edmonds | G06Q 30/0282 |
| | | | | 707/771 |
| 8,515,966 | B2 * | 8/2013 | Jammalamadaka | G06Q 30/02 |
| | | | | 707/748 |
| 10,636,075 | B2 | 4/2020 | Kannadasan et al. | |
| 2008/0244429 | A1 | 10/2008 | Stading | |
| 2010/0257171 | A1 | 10/2010 | Shekhawat | |
| 2011/0040752 | A1 * | 2/2011 | Svore | G06F 17/30696 |
| | | | | 707/728 |
| 2011/0258149 | A1 | 10/2011 | Kanungo et al. | |
| 2012/0123863 | A1 | 5/2012 | Kaul et al. | |
| 2012/0130981 | A1 * | 5/2012 | Risvik | G06F 17/30616 |
| | | | | 707/711 |
| 2012/0259844 | A1 * | 10/2012 | Yuan | G06F 16/9535 |
| | | | | 707/723 |

(Continued)

FOREIGN PATENT DOCUMENTS

| CN | 101114294 A | 1/2008 |
| CN | 102332025 A | 1/2012 |

(Continued)

OTHER PUBLICATIONS

International Preliminary Report on Patentability received for PCT Application No. PCT/US2017/021276, dated Sep. 20, 2018, 7 pages.

(Continued)

*Primary Examiner* — Lut Wong
(74) *Attorney, Agent, or Firm* — Shook, Hardy & Bacon LLP

(57) ABSTRACT

In various example embodiments, a system and method for computing a query feature score that can be used by a machine learning algorithm to rank search results is described. A query is received. The assigned probabilities for the arbitrary query is retrieved. The assigned probabilities is based on a probability model for a query feature. A score is computed for the query feature based on the assigned probabilities for the arbitrary query.

17 Claims, 23 Drawing Sheets

(56) References Cited

U.S. PATENT DOCUMENTS

| | | | |
|---|---|---|---|
| 2015/0142827 | A1 | 5/2015 | Hasan et al. |
| 2015/0324469 | A1 | 11/2015 | Keyngnaert et al. |
| 2016/0063115 | A1* | 3/2016 | Ayan ............... G06Q 50/01 707/722 |
| 2016/0321365 | A1* | 11/2016 | Duan ............... G06F 16/3346 |
| 2017/0262925 | A1 | 9/2017 | Rangasamy et al. |

FOREIGN PATENT DOCUMENTS

| | | |
|---|---|---|
| CN | 102339313 A | 2/2012 |
| CN | 102375856 A | 3/2012 |
| CN | 102667768 A | 9/2012 |
| CN | 103235786 A | 8/2013 |
| CN | 103914543 A | 7/2014 |
| CN | 103970857 A | 8/2014 |
| CN | 104424291 A | 3/2015 |
| CN | 104572958 A | 4/2015 |
| CN | 104866474 A | 8/2015 |
| CN | 105335391 A | 2/2016 |
| CN | 105378718 A | 3/2016 |
| CN | 108701014 A | 10/2018 |
| WO | 2017/156065 A1 | 9/2017 |

OTHER PUBLICATIONS

Non-Final Office Action received for U.S. Appl. No. 15/064,701, dated Feb. 25, 2019, 21 pages.
International Search Report for PCT Application No. PCT/US2017/021276, dated May 22, 2017, 2 pages.
International Written Opinion received for PCT Application No. PCT/US2017/021276, dated May 22, 2017, 5 pages.
Response to Non-Final Office Action filed on May 28, 2019, for U.S. Appl. No. 15/064,701, dated Feb. 25, 2019, 20 pages.
Final Office Action Received for U.S. Appl. No. 15/064,701, dated, Sep. 16, 2019, 25 pages.
Notice Of Allowance received for U.S. Appl. No. 15/064,701, dated, Nov. 27, 2019, 26 pages.
Communication Pursuant To Article 94(3) EPC received for European Patent Application No. 17763957.2, dated Mar. 26, 2021, 8 Pages.
EPO Decision to refuse received for European Patent Application No. 17763957.2 dated, Jul. 14, 2022, 4 Pages.
European Search Report Received for European Patent Application No. 17763957.2 dated, Jul. 30, 2019, 6 pages.
Summons to Attend Oral proceedings Received for European U.S. Appl. No. 17763957.2, mailed on Feb. 17, 2022, 10Pages.
Summons to Attend Oral proceedings Received for European U.S. Appl. No. 17763957.2, mailed on Mar. 11, 2022, 2 Pages.
Office Action Received for Chinese Patent Application No. 201780015583.7, dated Dec. 3, 2021, 9 pages (Official Copy Only).
Office Action received for Chinese Patent Application No. 201780015583.7 dated Apr. 14, 2022, 7 pages(Official Copy Only).
Jamie,"6 Tips to Help You Build Your SEO Strategy", Book Business 11.10: 32-33. North American Publishing Company d/b/a NAPCO, Dialog, Dec. 2008, 5 pages.
Wu et al., "A New Approach to Query Segmentation for Relevance Ranking in Web Search", 2015, 28 pages.

* cited by examiner

820
QUERY TERM-CATEGORY COUNT TABLE

| QUERY TERM | CATEGORY | VIEW ITEM COUNT (aggregated across all queries and grouped by categories) |
|---|---|---|
| front fenders | 33644 | 420 |
| front fenders | 72569 | 35 |
| front | 33644 | 420 |
| front | 72569 | 35 |
| fenders | 33644 | 420 |
| fenders | 72569 | 35 |
| camero front | 33644 | 10 |
| camaro | 33644 | 10 |
| 1956 chevy | 33644 | 15 |
| chevy front | 33644 | 15 |
| 1956 | 33644 | 15 |
| chevy front | 33644 | 15 |
| chevy | 33644 | 15 |

840
TOTAL VIEW ITEM COUNT PER QUERY TERM TABLE

| QUERY TERM | VIEW ITEM COUNT (aggregated for all categories) |
|---|---|
| front fenders | 455 |
| front | 455 |
| fenders | 455 |
| chevy front | 15 |
| chevy | 15 |
| camaro front | 10 |
| camaro | 10 |
| 1956 chevy | 15 |
| 1956 | 15 |

*FIG. 8B*

860 AFFINITY CALCULATION TABLE

| VIEW ITEM COUNT (aggregated across all queries and grouped by categories) | VIEW ITEM COUNT (aggregated across all categories) | AFFINITY FORMULA | AFFINITY |
|---|---|---|---|
| 420 | 455 | 420/455 | 0.923 |
| 35 | 455 | 35/455 | 0.077 |
| 420 | 455 | 420/455 | 0.923 |
| 35 | 455 | 35/455 | 0.077 |
| 420 | 455 | 420/455 | 0.923 |
| 35 | 455 | 35/455 | 0.077 |
| 10 | 10 | 10/10 | 1 |
| 10 | 10 | 10/10 | 1 |
| 15 | 15 | 15/15 | 1 |
| 15 | 15 | 15/15 | 1 |
| 15 | 15 | 15/15 | 1 |
| 15 | 15 | 15/15 | 1 |
| 15 | 15 | 15/15 | 1 |

FIG. 8C

CATEGORY RELEVANCE DICTIONARY 890

| SITE | CATEGORY | QUERY TERM | AFFINITY |
|---|---|---|---|
| 1 | 33644 | front fenders | 0.923 |
| 1 | 72569 | front fenders | 0.077 |
| 1 | 33644 | front | 0.923 |
| 1 | 72569 | front | 0.077 |
| 1 | 33644 | fenders | 0.923 |
| 1 | 72569 | fenders | 0.077 |
| 1 | 33644 | camero front | 1 |
| 1 | 33644 | camaro | 1 |
| 1 | 33644 | 1956 chevy | 1 |
| 1 | 33644 | chevy front | 1 |
| 1 | 33644 | 1956 | 1 |
| 1 | 33644 | chevy front | 1 |
| 1 | 33644 | chevy | 1 |

FIG. 8D

EXAMPLE 1: 910

Constant for bigram 924
Constant for token miss penalties 925

$$\text{Score}(c_j | q) = (2.0 * 0.551) / (2 + 2.5 * 2) = 0.220$$
921     922     923

920

| Category | Bigrams and Unigrams* | Affinity | Total Number of Tokens (n) | Tokens Having Affinity with Category (nt) | Tokens Lacking Affinity with Category (nl) |
|---|---|---|---|---|---|
| 73954 | electrical socket | 0.551 | 4 | 2 | 2 |
| 73954 | electrical | 0.204 | 4 | 2 | 2 |

EXAMPLE 2: 930

Constant for bigram 945
Constant for token miss penalties 946

$$\text{Score}(c_j | q) = (2.0 * 0.551 + 2.0 * 0.430) / (4 + 2.5 * 1)$$
$$= 0.302$$
941     942     943     944

940

| Category | Bigrams and Unigrams* | Affinity | Total Number of Tokens (n) | Tokens Having Affinity with Category (nt) | Tokens Lacking Affinity with Category (nl) |
|---|---|---|---|---|---|
| 73954 | electrical socket | 0.551 | 4 | 4 | 1 |
| 73954 | socket spacer | 0.43 | 4 | 4 | 1 |
| 73954 | electrical | 0.204 | 4 | 4 | 1 |

* Unigrams not used to compute score if already included in a bigram.

FIG. 9

SYSTEM AND METHOD FOR COMPUTING FEATURES THAT APPLY TO INFREQUENT QUERIES

TECHNICAL FIELD

Embodiments of the present disclosure relate generally to data processing and, more particularly, but not by way of limitation, to computing category relevance of a query.

BACKGROUND

Searching e-commerce sites, as well as other searching performed on the Internet, is often performed by receiving queries from users. A query refers to a request for information from one or more databases. In various embodiments, the query parameters, also referred to as search terms, are provided by the user by typing in one or more search terms. In some embodiments, the query parameters may be chosen from a menu.

The relevance of e-commerce searching can directly and measurable impacts sales. For example, presenting items to a user that are most relevant to that user is more likely to lead to a sale of an item by that user. Locating the most relevant items for purchase is generally done by searching the databases.

BRIEF DESCRIPTION OF THE DRAWINGS

Various ones of the appended drawings merely illustrate example embodiments of the present disclosure and cannot be considered as limiting its scope.

FIG. 8B illustrates aggregating view item counts from a query-term category table to a total view item count per query term table, in accordance with an example embodiment.

FIG. 8C illustrates a table for computing affinity calculations, in accordance with an example embodiment.

FIG. 8D illustrates a category relevance dictionary according to an example embodiment.

FIG. 9 illustrates two examples of a function used to compute the inferred category demand score.

Figure 1A:
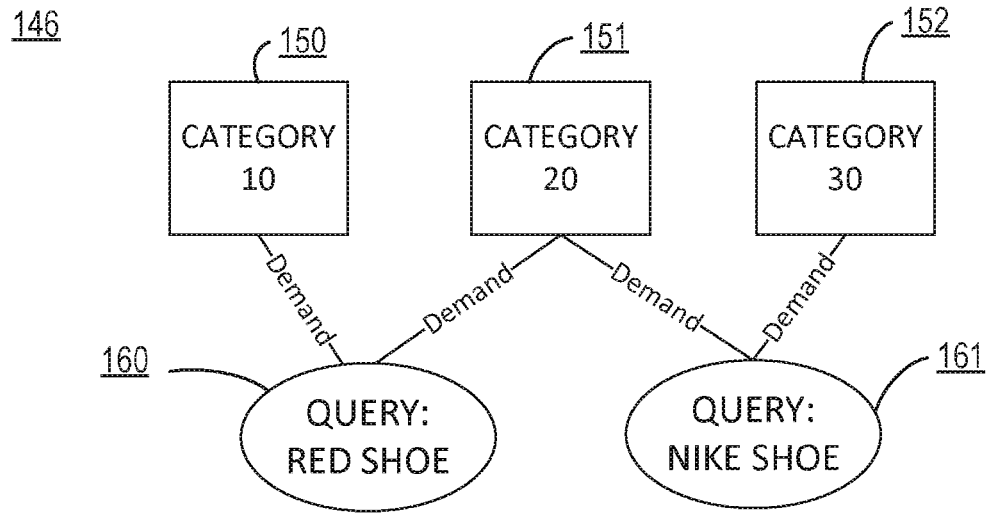
FIG. 1A is a conceptual diagram illustrating category demand for example queries.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In example embodiments, a number of features are used by a search system to generate results for a search query. The search system searches one or more databases for items matching the query and then returns various items to be presented to a user. The items are presented in a ranked order based on predictions made by the search system as to the most relevant results for users. The search system uses a number of features to determine the relevancy of items from a database of items. For example, the database of items may represent an inventory database in an e-commerce system in some example embodiments. In other embodiments, the search system is not limited to an e-commerce system, and may be used for other types of searching.

In various embodiments, features are related to items and may be used to describe items. For example, a feature may represent an item title, an item price, a name of a seller of an item, other seller information, category of an item, and computed values (e.g., demand for a price by buyers and demand for a category). Data from user interactions may be used to measure a feature. Various types of user interactions when presented with search results include viewing an item (e.g., by clicking on it), purchasing an item, bidding on an item, watching an item, and other types of user interactions. Each of the features can be represented quantitatively by the search system. By defining a set of features for items, each of the items may be represented quantitatively by taking into account the various features used by the system to rank items returned from a query. For example embodiments, this quantitative measure can be referred to as a ranking score, and is used to compare a number of items to measure relevancy of an item for a given search query. The ranking score impacts the order in which search results are presented to a user.

One way to improve the ranking score is to select features that are most useful in measuring relevancy or importance of a returned item relative to other returned items. It has been observed that category demand is a useful feature in ranking returned items to enable a search system to predict the most relevant search results for a query. Category demand is an example of one feature that is considered useful in ranking items. Although example embodiments are described with respect to the category demand feature, the scope and spirit of the invention is not limited to the category demand feature and may be applied to any number of features.

Category demand refers to the demand for a category for returned items. The category demand helps the search system to predict "which category will users purchase from." More specifically, category demand refers to the demand for categories based on past user queries and their interactions with the search system, and therefore may provide a useful measure as to what may be relevant to a current user searching on an e-commerce site. For example, past users searched for "Camaro front fenders" and then clicked on items in the category Motors>P&A>car parts>Exterior>fenders. This example indicates how clicking (or viewing item via clicking) is used to compute a "demand" for the category "Motors>P&A>car parts>Exterior>fenders" from the query "Camaro front fenders." The demand for this particular category is based on the number of times past users click on items associated with this category when the search system received the same query "Camaro front fenders."

The ability of a search system to compute category demand depends on the frequency at which the search system receives the same query (e.g., "Camero front fenders.") from past users, or at least recognizes the same query. In the event that a query is not frequent enough (i.e., from past users) for a system to compute category demand for a given query, example embodiments compute an inferred category demand for a given query.

In some embodiments, inferred category demand represents an alternative to category demand when a query is not frequent enough for a system to directly compute the category demand for that query. In other embodiments, inferred category demand may be computed regardless of the frequency in which the query was received from past users. Inferred category demand is not computed directly from the historical query data of past users.

In various embodiments, a feature of a query represents a feature selected for ranking based on its usefulness in ranking. If the query occurs often, then the search system simply computes the value feature directly from the historical data (i.e., of past user queries). On the other hand, if the query is considered an infrequent query, then the feature cannot be computed directly from the historical data.

In various embodiments, a query that is not frequent enough (based on historical data of past user queries) is referred to as a tail query. A determination as to what is frequent enough may vary from one search system to another. For example, one search system may base frequency on receiving the same query one hundred times in the past four weeks. In this example, a tail query may refer to a query that did not satisfy a threshold requirement of receiving the same query one hundred times in the past four weeks. Although this example describes a search query for an e-commerce system, in various embodiments, the system and method of computing features from an infrequent query is not limited to search systems from e-commerce sites. For the various features associated with infrequent queries, a number of probability models that assigns probabilities to arbitrary queries may be used.

For the feature being represented by category demand, each query has a probability model with respect to categories. In some embodiments, category demand also accounts for impressions (i.e., views of items from the results without clicking). In further embodiments, category demand is a complex function that accounts for various other user interactions (e.g., purchase of an item, watching an item, and bidding on an item) with a user interface of a search system.

On the other hand, inferred category demand uses a different model from category demand. Instead of modeling each query with respect to categories, each category is modeled over a vocabulary of query terms to create an affinity score for each category-query term pair. In an example embodiment, the inferred category demand probability model may be based query terms representing unigrams and bigrams of a query. In another example embodiment, the probability model may rely on trigrams or some other segmentation of the query. The query segmentation may be over-lapping in some example embodiments and non-overlapping in other example embodiments. In further embodiments, the inferred category demand model may be based on a conditional random field, or recurrent neural networks. For the various features associated with infrequent queries, a number of probability models that assigns probabilities to arbitrary queries may be used.

For various embodiments, an affinity score is generated for each category-query term pair. The term affinity is used to represent a measure of the strength between a query term and a category, and can be used to compute the inferred category demand score for a query. There are a number of ways to compute affinities based on common functions in information theory such as MI (c,t|click) with variations involving skipped items, Chi-Square (c, t|click), P(c|t, click) with and without variations, and nClick (c,t), where c=category and t=query term. A function to compute affinity of a category-query term pair may be selected by determining which function gives the best results for a data set. A random variable like z, which measures the deviation of data form the expected value, is sometimes referred to as $X^2$ or chi-squared. P refers to probability. nClick refers to the number of clicks. MI refers to mutual information.

In various example embodiments, the affinity of a category-query term pair is based on the conditional probability of the query term given a category, and may be described by the function P(c|t, click) with and without variations. For an example, the category-query term affinities are computed by the formula: Category-query term affinity=P (c|t, VI), where c=category, t-query term, and VI=view item count. In various embodiments, the VI (view item count) represents the clicks. Based on this category-query term affinity formula, the number of view item counts on a category when the query has a query term is divided by the total view item count when the query has the query term. In an example embodiment, the query term "t" refers to unigrams and bigrams. However in other example embodiments, other forms of segmentation of the query may be implemented. In further embodiments, the weighted average of P (c|t) for all terms t of the query is computed. During runtime, the query is segmented into non-overlapping segments when computing an inferred category demand for an arbitrary query.

Bayes rule is a mathematical formula used for calculating conditional probabilities. The probability of Q is conditional on P. For one example, Q may represent category (c) and P may represent query terms (t). Bayes rule uses a model for how P is generated by Q. In some example embodiments, Bayes rule may be used to estimate the probability of Prob (Q|P). According to Bayes rule, the Prob (Q|P) (what we want) can be obtained by using Prob (P|Q). The formula for Prob (P|Q) is not limited to any specific formula. In example embodiments, Bayes rule may be applied during runtime.

FIG. 1A is a conceptual diagram 146 illustrating category demand for example queries. A query 160 for "red shoe" has a demand for items in category 10 (shown by reference number 150) and category 20 (shown by reference number 151). A query 161 for "nike shoe" has a demand for items in category 20 and category 30 (shown by reference number 152).

When a query is received from the user 106 by an e-commerce site, the frequency of the query by past users can be determinative as to whether or not the query has an associated category demand score. A significant portion of the queries received may not have a category demand score associated with it. For example, approximately 45% of all queries received by some e-commerce sites do not have a category demand score associated with the query. Such a query may be referred to as a tail query. When a query is received, the e-commerce system may use a category demand dictionary as a look up table to determine whether a category demand exists for that given query.

In some embodiments, an inferred category demand score is computed (based on category relevance) if a category demand score does not exist in the look up table of the category demand dictionary. Thus, when a query is frequent enough, an e-commerce site may use historical information of that whole query and only that query, to compute a category demand score, and if a query is not frequent enough, the e-commerce site may use historical information of the parts of the query (i.e., referred to as query terms and represent bigrams and unigrams) to compute an inferred category demand score. Affinity of a query term is one parameter used to determine the inferred category demand score in example embodiments.

Accordingly, the affinity of query terms of a query are computed when computing an inferred category demand score. The term affinity is used to represent a measure of the strength between a query term and a category, and can be used to compute the inferred category demand score for a query. There are a number of ways to compute affinities based on common functions in information theory. A function to compute affinity of a category-query term pair may be selected by determining which function gives the best results for a data set.

Figure 8A:
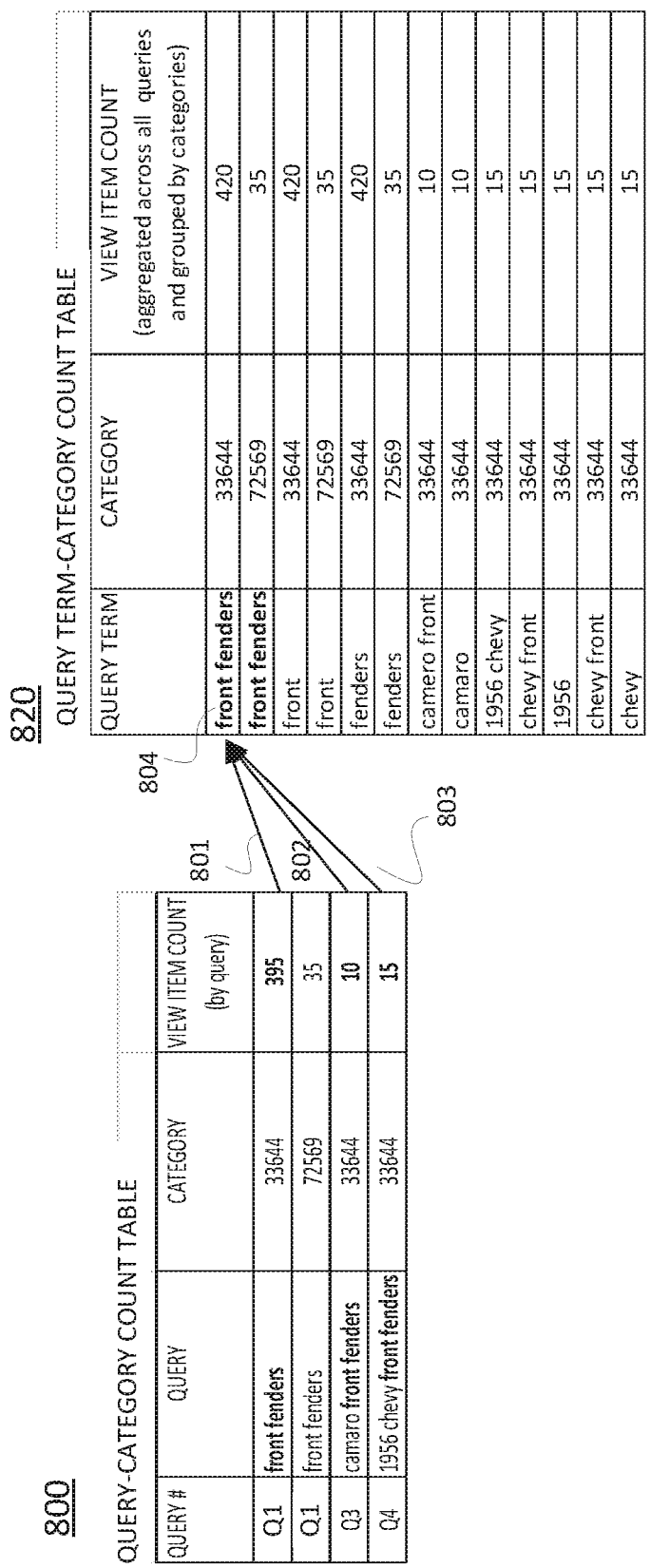
FIG. 8A illustrates aggregating view item counts from a query-category count table to a query term-category count table, in accordance with an example embodiment.

In various example embodiments, the affinity of a category-query term pair is based on the conditional probability of the query term given a category, and may be described by the function P(c|t, click) with and without variations. When computing an inferred category demand score, an e-commerce system models each category over a vocabulary of query terms to create an affinity for each category-query term pair. Thus, the term affinity is also referred to as a category-query term affinity. FIGS. 8A-8C provides an example of computing the affinity of the category-query term pair using conditional probabilities.

Figure 1B:
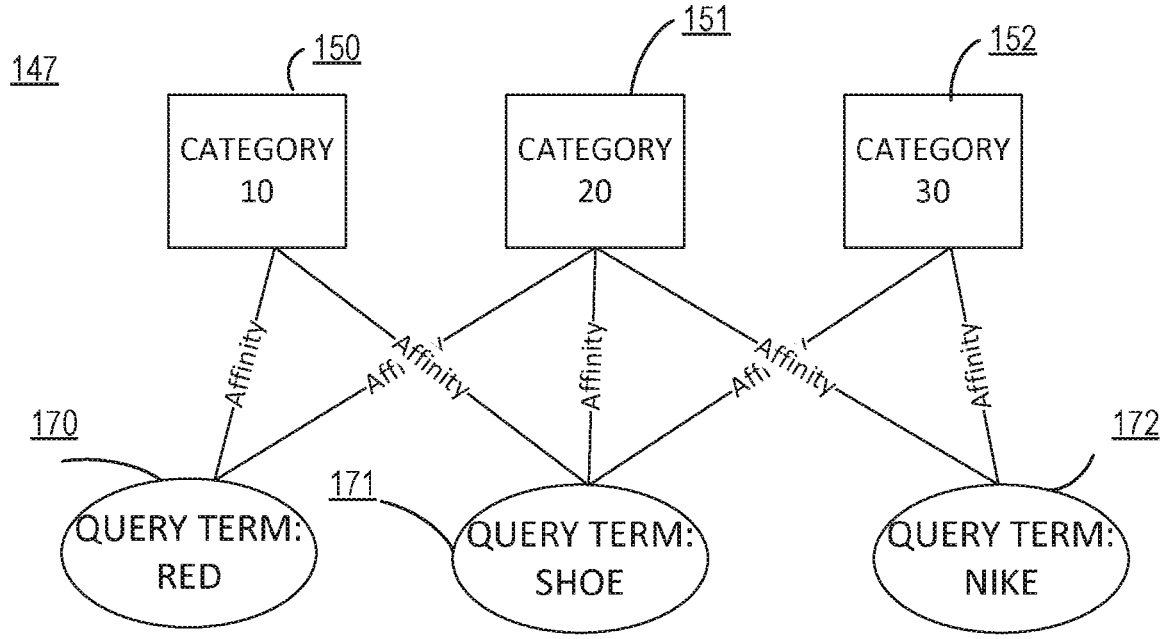
FIG. 1B is a conceptual diagram illustrating category affinities for query terms of a query.

FIG. 1B is a conceptual diagram 147 illustrating category-query term affinities, in accordance with an example embodiment. As described above, a query term refers to a unigram or a bigram of a query. For the query "red nike shoe," there are two bigrams (i.e., red nike and nike shoe) and three unigrams (i.e., red, nike, shoe). For simplicity, the diagram 147 only shows the category-query term affinity for the unigrams. The query term 170 for "red" has a category-query term affinity with category 10 and category 20. The query term 171 for "shoe" has a category-query term affinity with categories 10, 20 and 30. The query term 172 for "nike" has a category-query term affinity with categories 20 and 30.

The affinities of a category-query term pair are computed offline in example embodiments. These affinities are also referred to as query term-category affinities. The affinities, along with various other factors related to tokens, are used to compute a score referred to as an inferred category demand score. The term token refers to the number of terms in a search query that are separated by white spaces. The inferred category demand scores can be computed during runtime for a query. The inferred category demand scores represents the inferred relevance between queries and categories. Computing the inferred category demand score is an alternative method of computing demand for a category, when a category demand score cannot be computed by a system (e.g., e-commerce site) because a particular query is too infrequent. In some embodiments, a system may compute an inferred category demand regardless of the frequency of a query. In example embodiments, the inferred category demand score and/or an category demand score, are used as inputs into one or more search ranking algorithms to compute search results for queries.

As described above, affinities are computed (offline) for each query term in a query, and hence referred to as query term-category affinities. The query term-category affinities for a query are then used to compute an inferred category demand score for a query (during runtime).

Figure 1C:
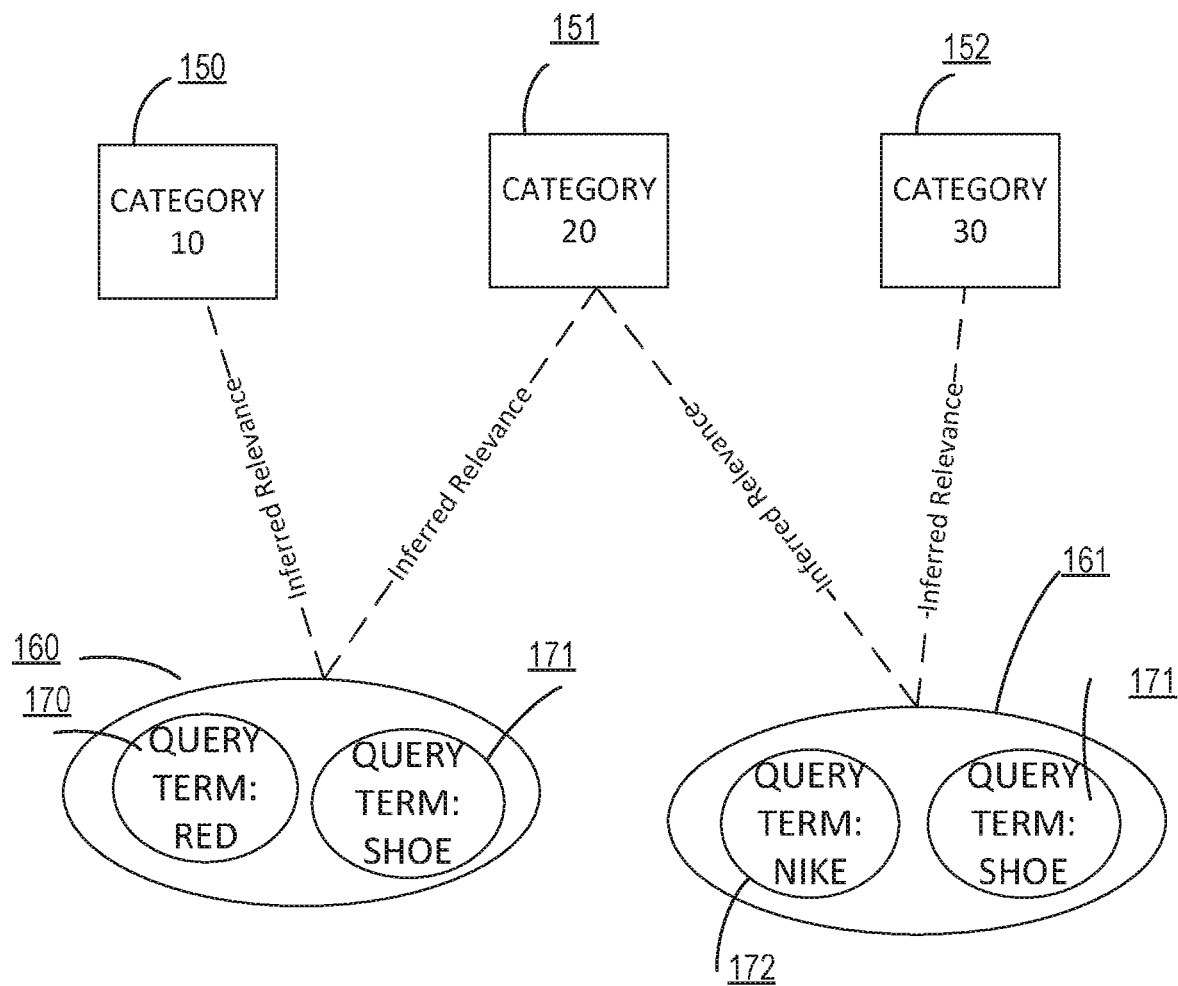
FIG. 1C is a conceptual diagram illustrating category inferred relevance for queries grouped by query terms.

FIG. 1C is a conceptual diagram 148 illustrating category inferred relevance for queries grouped by query terms, in accordance with an example embodiment. In various embodiments, the inferred relevance is represented as an inferred category demand score. The query terms 170 for "red" and 171 for "shoe" are combined for the query 160 "red shoe." The query terms 171 for shoe and the query term 172 for "nike" are combined for the query 161 "nike shoe." The query 160 for "red shoe" has an inferred relevance for categories 10 and 20. The query 161 for "nike shoe" has an inferred relevance for categories 10 and 20. FIG. 9 illustrates two examples of a function used to compute the inferred category demand score. The computation of the inferred category demand score will be discussed in further detail with FIG. 9.

Thus, FIGS. 1A-1C illustrate that when a query is frequent enough, historical information of a whole query (and only that query) is used to compute category demand, and if a query is not frequent enough for the e-commerce system to compute a demand for a category, then the e-commerce system uses historical information of the parts of a query referred to as query terms (representing bigrams and unigrams of the query) to infer a demand for the category (i.e., inferred category demand) for the query. The inferred category demand for a query is based on an inferred relevance between query terms and categories. In example embodiments, the computed demand for a category referred to as CD ranking scores (including the category demand scores and the inferred category demand scores) may be included with a ranking profile of an e-commerce site, and used as one of the inputs (directly or via business rules) into one or more search ranking algorithms.

Figure 1D:
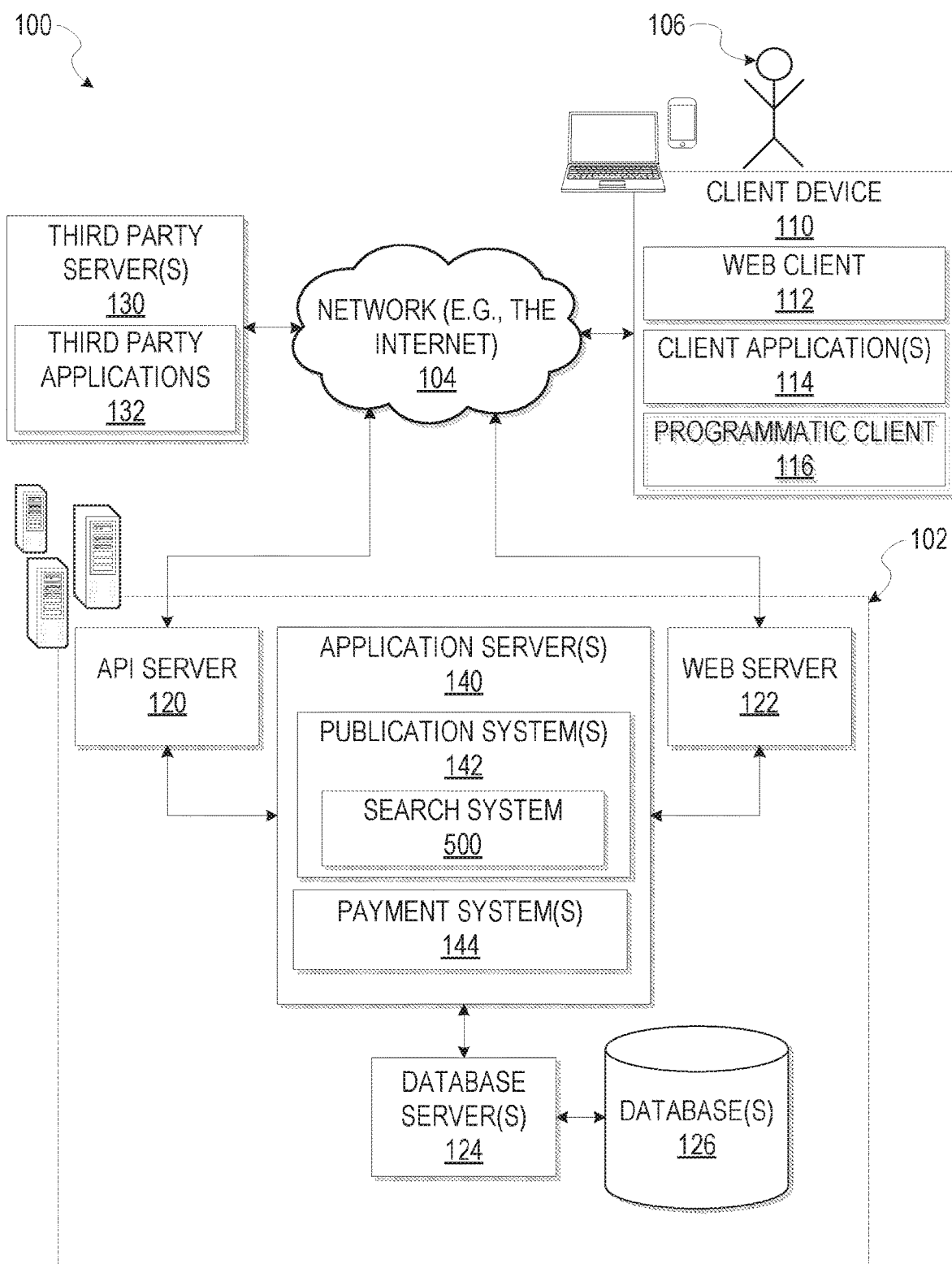
FIG. 1D is a block diagram illustrating a networked system, according to some example embodiments.

With reference to FIG. 1D, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1D illustrates, for example, a web client 112 (e.g., a browser, such as the Internet Explorer® browser developed by Microsoft® Corporation of Redmond, Wash. State), one or more application(s) 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth.

The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions.

One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110. In various embodiments, a user 106 may interact with a client application 114, such as a marketplace application, by submitting queries to search for items available on the marketplace application. The user 106 may further interact with the marketplace application, for example, by viewing items presented on the search results page, clicking on items presented on the search results page to view the item details, selecting items to be placed in a shopping cart, and purchasing items placed in the shopping cart.

Figure 5A:
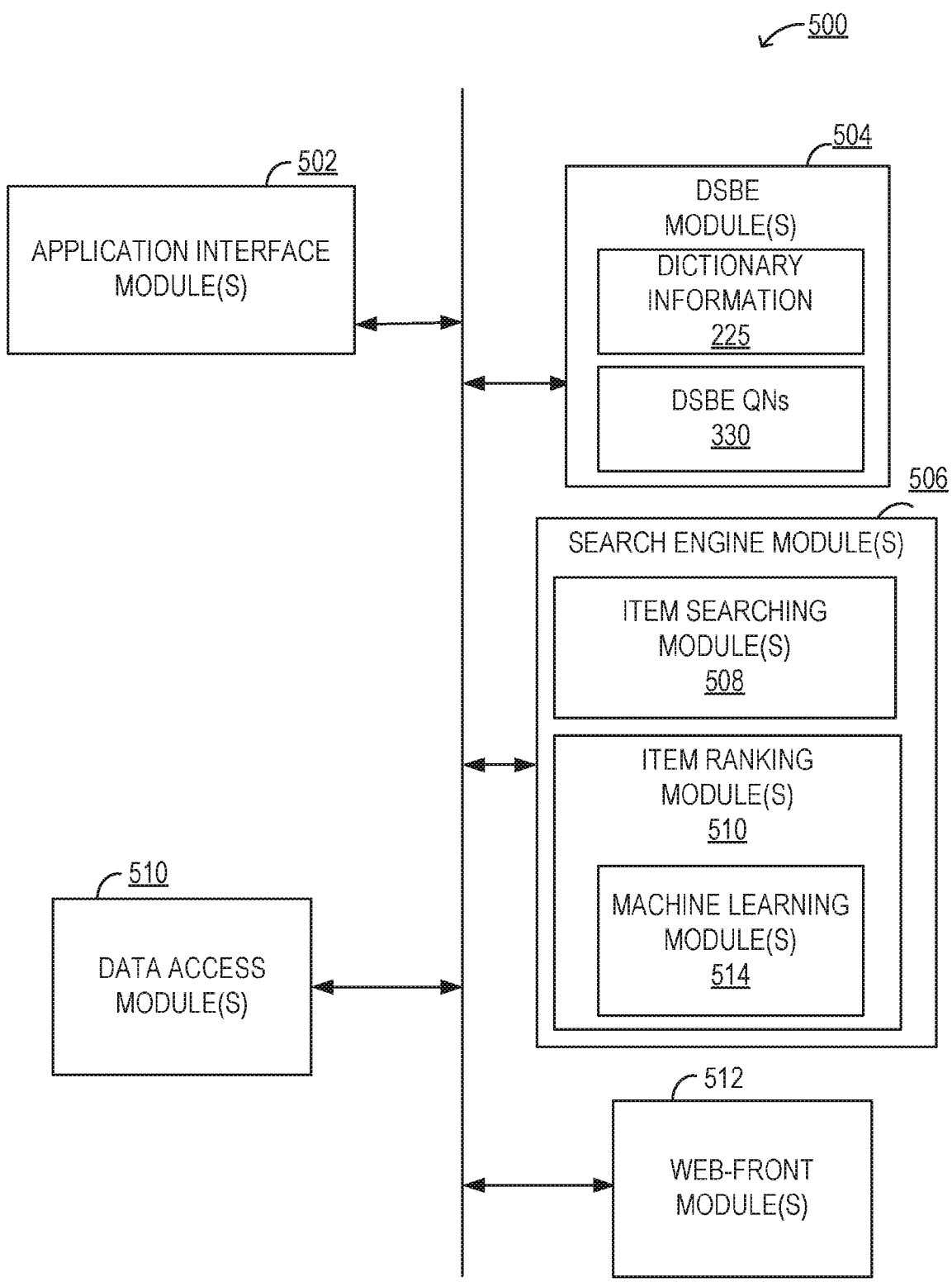
FIG. 5A is a block diagram of a runtime system for processing queries, in accordance with an example embodiment.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. In example embodiments, the publication system 142 may represents an-commerce site. In various embodiments, the publication system 142 may include a search system 500. The search system 500 is shown in FIG. 5A in further details. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital item information in accordance with example embodiments.

In example embodiments, the databases 126 may include one or more databases that store item information such as listings indexed by categories, index information used to index the item listings, log information such a log of user behavioral data (including search queries from past users and associated user interactions related to the search queries), and dictionary information that stores price demand information, category demand information, and category relevance information (that can be used to infer category demand). FIG. 1D illustrates the dictionary information 225 item information 226, log information 227, and index information 228 within one or more databases 126 stored within one or more databases 126.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. For example, the publication systems 142 may provide an e-commerce site that users 106 may shop on. The users may access this e-commerce site via a client application 114, such as a marketplace application. While shopping online via a marketplace application, users 106 can submit search queries and review the search results provided by the publication system 142. The search results provides a listing of items in a ranked order. The demand for a category (based on view item counts or other interactions with the user) is one factor used by ranking algorithms to rank the item listings in the search results presented to the user 106 on the client device 110.

The payment systems 144 may likewise provide a number of functions to perform or facilitate payments and transactions. For example, the payment systems 144 may allow users 106 to purchase items from an e-commerce site. While the publication system 142 and payment system 144 are shown in FIG. 1D to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

Further, while the client-server-based network architecture 100 shown in FIG. 1D employs a client-server architecture, the present inventive subject matter is of course not limited to such an architecture, and could equally well find application in a distributed, or peer-to-peer, architecture system, for example. The various publication system 142, payment system 144, and personalization system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 128, executing on a third party server(s) 130, is shown as having programmatic access to the networked system 102 via the programmatic interface provided by the API server 114. For example, the third party application 128, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2A:
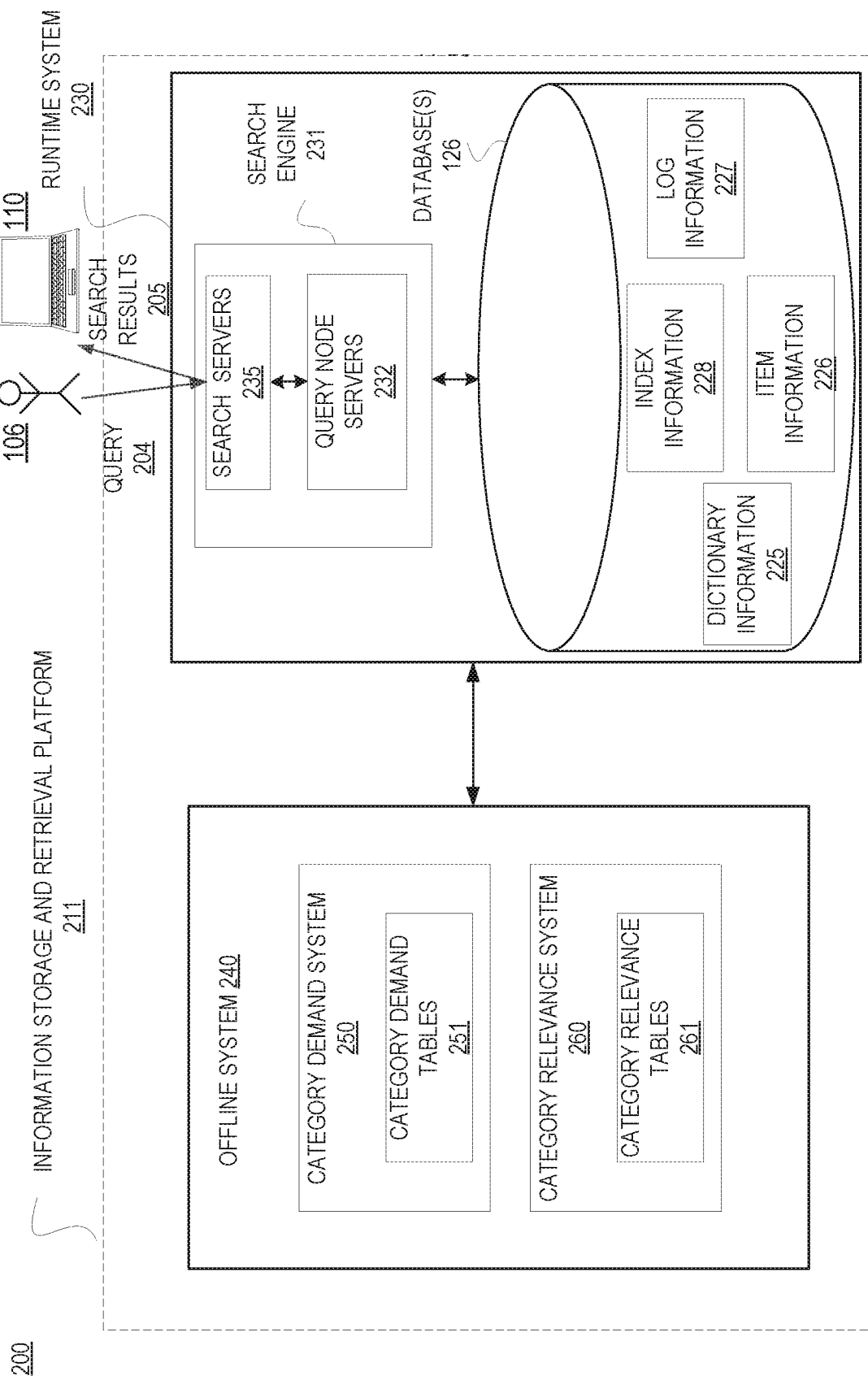
FIG. 2A illustrates a block diagram of an information storage and retrieval platform, including a runtime system and an offline system, in accordance with an example embodiment.

FIG. 2A illustrates a system 200 for an information storage and retrieval platform 211 that utilizes a search infrastructure, according to an example embodiment. The information storage and retrieval platform 211 is communicatively coupled over a network (e.g., Internet) (not shown) to the client machine 100 associated with the user 106. The information storage and retrieval platform 211 includes a runtime system 230 and an offline system 240.

In various embodiments, the information storage and retrieval platform 211 provides a system for computing e-commerce category relevance of an arbitrary user query. Although the platform 211 is described with respect to the query feature category demand, the platform 211 can be used with other query features. For example, the category demand system 250 and category demand tables 251 may be generalized to broadly represent a query feature system that generates and stores a query feature table.

The category relevance for a query may be referred to as an inferred category demand for a query. One or more components of the information storage and retrieval platform 211 may be included within the publication system 142, shown in FIG. 1D. The various components within the information storage and retrieval platform 211 may be communicatively coupled with any combination of a wide area network, local area network, wireless network, or any other type of network utilizing various networking technologies.

In example embodiments, the runtime system 230 includes the searchable portion of the publication system 142 and may be referred to as a search system that provides query searching functionality. The runtime system 230 includes search servers 235, query node servers 232, and one or more databases 126. In an example embodiment, the search servers 235 and the query node servers 232 are included within a search engine 231. The backend system is also described in FIG. 3.

Some of the information stored in the databases 126 are accessed by the offline system 240 to generate one or more dictionaries offline. For example log information 227, which includes search information from prior queries and various user interactions associated with those queries, is accessed by the offline system 240 to generate category demand tables 251 and category relevance tables 261. The log information may be accessed periodically and used to update one or more of the tables 251 and 261 offline. A copy of the tables 251 and 261, or updates to the tables 251 and 261, which are computed offline are transferred to the runtime system 230 and stored in the databases 126 as dictionary information 225, which is accessible during runtime in example embodiments.

The offline system 240 shown in FIG. 2A includes a category demand system 250, which computes the category demand tables 251, and a category relevance system 260 which computes the category relevance tables 261. The generation of the category demand tables 251 and the category relevance tables 261 are performed offline. In example embodiments, the category relevance tables 261 represent a text file with rows, and each row contains (site ID, query term, category, category-query term affinity). The process of computing the category relevance tables 261 may be automated on a regular basis (e.g., weekly) to ensure the data stays fresh. The text file generated is then copied and loaded into the databases 126 as dictionary information 225. For an example embodiment, the category relevance tables 261 are stored as dictionary information 225 in the databases 126 in the runtime system 230. The dictionary information 225 is accessible by the runtime system 230 when a query is received. An example of a category relevance dictionary is shown in FIG. 8D.

During runtime, the dictionary information 225 may be used as a lookup table to identify category-query term affinities for a query. Thus, only parts of the query, referred to as query terms are used during the lookup process. The category-query term affinities for queries are used to compute the inferred category demand score for an entire query.

For an example embodiment, the category-query term affinities are computed by the formula: Category-query term affinity=P (c|t, VI), where c=category, t=query term, and VI=view item count. Based on this category-query term affinity formula, the number of view item counts on a category when the query has a query term is divided by the total view item count when the query has the query term. The category relevance dictionary 225C stores the information as tuples (site, category, query term, category-query term affinity). In example embodiments, the tuples may have one or more of the following constraints: nclick (query term)>=5; a category-query term affinity >0.001; per (site, category) taking the top 90,000 terms by "Jaccard score." The Jaccard score is defined as follows:

$$N(\text{category},\text{term})/(n(\text{category})+n(\text{term})-n(\text{category},\text{term})),$$

where n is the count of clicks.

The Jaccard pruning may improve categories with a large lexicon, such as cell phone cases, covers and skins. The Jaccard score represents one form of an information-theoretic measure of affinities. In various other embodiments, other forms of information-theoretic measures of affinities may be used.

In various embodiments, the weighted average of the category-query term affinities for a query are used to compute the inferred category demand score. The weighted average of P (cat|term) with weighting by numbers of tokens in the query term. P (cat|term) represents an example function used to compute category-query term affinity. In determining the weighted average of the category-query term affinity, bigrams and unigrams cannot overlap with each other. In other words, a unigram must not be included within a bigram and is referred to as a non-overlapping unigram. The rational for using only non-overlapping unigrams is that unigrams have the least context so they may represent noisy category-query term affinities. Additionally, unigrams should only be used when all else fails, i.e., no longer n-gram can cover the unigram. In some embodiments a constant of 2.5 is used for missed tokens. The function for computing the inferred category demand score is described in further detail below. Additionally, FIG. 9 provides examples of computing the inferred category demand score.

For example embodiments, a category demand table 251 (including fields for site, query, category, and category demand) is stored within the dictionary information 225, and is accessible during runtime. The dictionary information 225 may be used as a lookup table to identify category demand for a given query. Thus, the entire query is used during the lookup process. The category demand, and other statistical information (e.g., price demand) generated from past queries, may also be used by a search engine to produce search results 205 in a ranked order.

The demand for a category of a given search is based on historical data, for example, what past users searched and what items they viewed by clicking on the item. For a given query, the categories associated with the viewed items, or other interactions with the users (e.g., impressions or viewing search results without clicking), for a query may be used to determine the category demand for that given query, provided the query is frequent enough for the offline system 240 to compute the category demand. In various embodiments, the dictionary information 225 does not store category demand scores for tail queries. Generally, frequent queries are more likely to have an associated category demand score than less frequent queries. The less frequent queries may be referred to as tail queries. The frequency of a query may be determined by the number of past users who submitted the same query and then viewed items (by clicking) from the search results. For example, if a query was submitted more than 100 times in the past 4 weeks, it is likely to be included in the category demand tables 251 in an example embodiment. The frequency of a query may also be determined in a various other ways, provided that a category demand system 250 has sufficient historical data to compute category demand for a query.

During runtime, if the user 106 submits a query 204 and that query 204 does not have a category demand that was computed by the category demand system 250 offline, the runtime system 230 may use (or compute) an inferred category demand for that query 204. Category relevance information (e.g., category-query term affinities) generated by the category relevance system 260 offline, may be used to compute an inferred category demand score for that query 204 during runtime. In various embodiments, the DSBE 504 (shown in FIG. 5A) computes the inferred category demand which is used by a search engine to rank the items returned from the query 204. The DSBE will be discussed in further detail in conjunction with FIG. 3 and FIG. 5A.

The information stored in the databases 126 in the runtime system 230, which is accessed by the query node servers 232, is stored in a format that can be consumed by the query node servers 232. For example the dictionary information 225 and the index information 228 are accessed by the query node servers 232 during runtime and are stored in a format that can be consumed by the query node servers 232. During runtime, the runtime system 230 performs two separate and independent processes. One process is to determine the demand for categories using the DSBE QNs 330 (shown in FIG. 3). The second process is to return the matched items using the item QNs 325 (shown in FIG. 3). The category demand scores for one or both of the category demand or the inferred category demand are used by the search engine modules 506 (shown in FIG. 5A) to rank the matched items from the search query.

The search servers 235 may include search front-end servers that executes on search machines (not shown) and search back-end servers that execute on search machines (not shown) communicatively coupled together. In example embodiments, the query node servers 232 include two types of QNs, the item QNs and the DSBE QNs. The item QNs are queried to find the matched items for a query. The DSBE QNs includes nodes to retrieve the category demand score for queries. The DSBE QNs also includes nodes to compute an inferred category demand score. The item QNs and the DSBE QNs will described in further detail in conjunction with FIG. 3.

Figure 4:
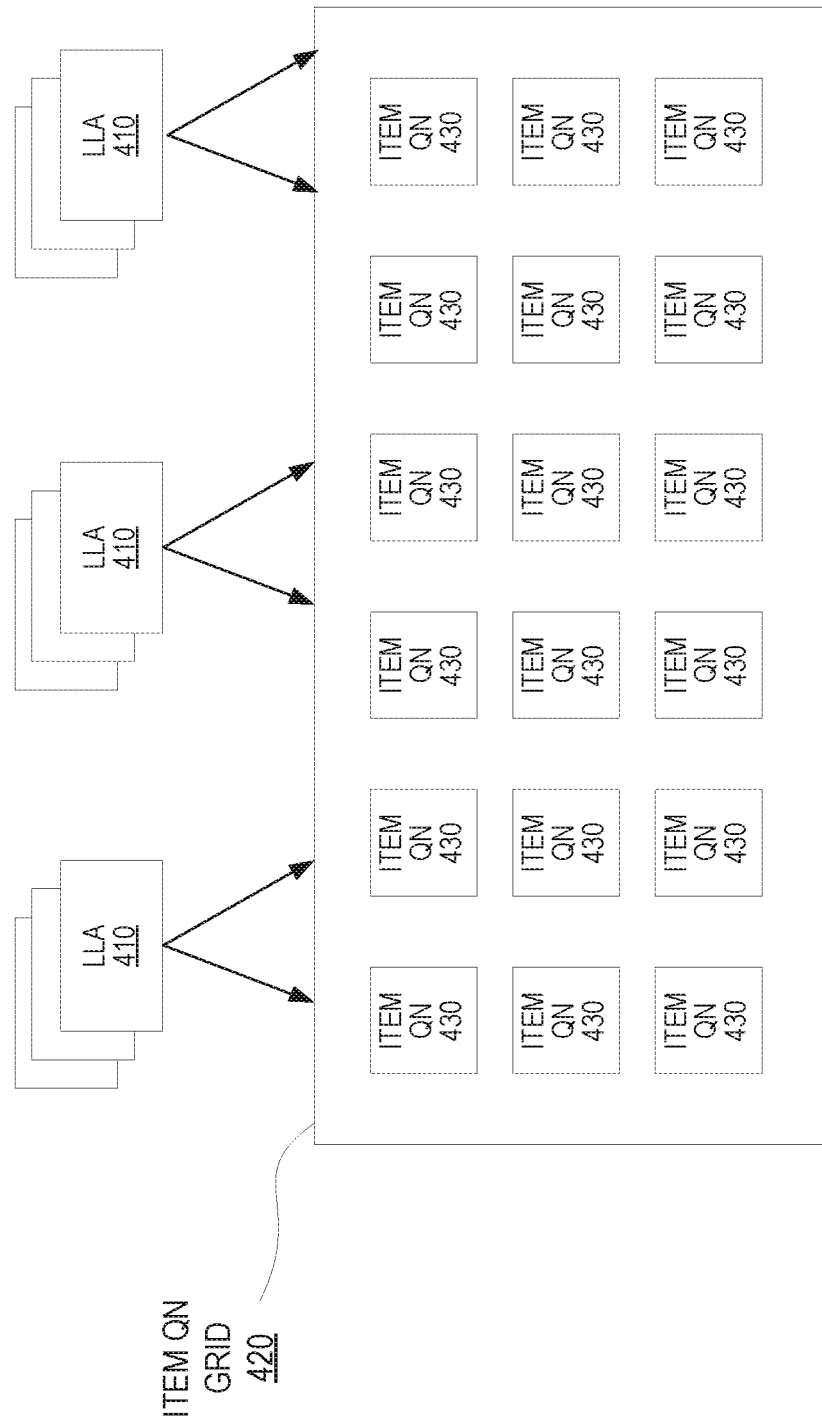
FIG. 4 illustrates a block diagram of low level aggregators (LLA) querying a grid of item query nodes, in accordance with an example embodiment.

The index information 228 may be stored in memory of the query node servers 232 and/or in the database 126 connected to the query node servers 232. The index information 228 may be used to perform index lookup in the item QNs. In some embodiments, the item QNs within the query node servers 232 receives a copy of what is published by the publication system 142. For example, index information 228 (e.g., updated documents or actual data, and inverted index data) gets copied into every single item QN in query node servers 232. The query node servers 232 may be comprised of a search grid of item QNs that is arranged in columns of QNs. Each column of query node servers 232 may be utilized to manage a range of the documents. FIG. 4 illustrates and example of a search grid of item QNs.

The user 106 who operates the client device 110 may enter a query 204 that may be communicated over a network (e.g., Internet) via search servers 235 to be received by the query node servers 232 which may be divided into two layers in an example embodiment. The two layers may include an aggregation layer and a query execution layer. The aggregation layer may include a query node server 232 that includes a query engine (not shown) that receives the query 204 that, in turn, communicates the query to multiple query engines that respectively execute in the execution layer in multiple query node servers 232 that correspond to the columns. The aggregation layer may include a top level aggregator (TLA) and low level aggregators (LLA). The query engines in the query execution layer may, in turn, respectively apply the same query, in parallel, against respective indexes from the index information 228 that were generated for a range of document identifiers (e.g., column) to identify search results (e.g., document) in parallel. Finally, the query engines, at each query node server 232 in the query execution layer, may communicate their respective partial search results 205 to the query engine in the aggregation layer which aggregates the multiple sets of partial search results to form a search result 205 for the entire index information 228 and to communicate the search result 205 over the network to the user 106 by presenting the search results 205 on the client device 110.

Figure 2B:
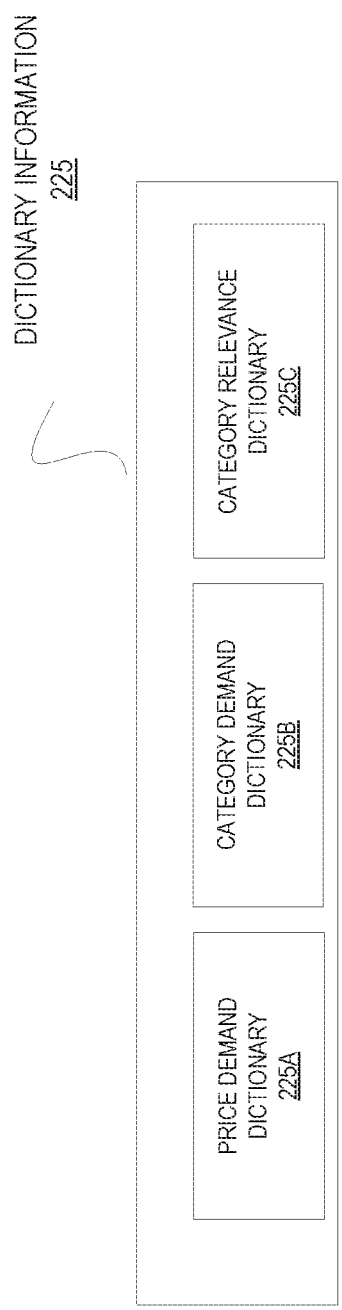
FIG. 2B illustrates a block diagram of the dictionary information shown in FIG. 1D with multiple dictionaries, in accordance with an example embodiment.

As mentioned above, the dictionary information 225 includes one or more dictionaries that may be used as lookup tables. FIG. 2B illustrates the dictionary information 225 in further detail. The dictionary information 225 shown in FIG. 2B includes dictionaries such as a price demand dictionary 225A, a category demand dictionary 225B, and a category relevance dictionary 225C. In other embodiments, the dictionary information 225 may include other dictionaries as well.

Figure 3:
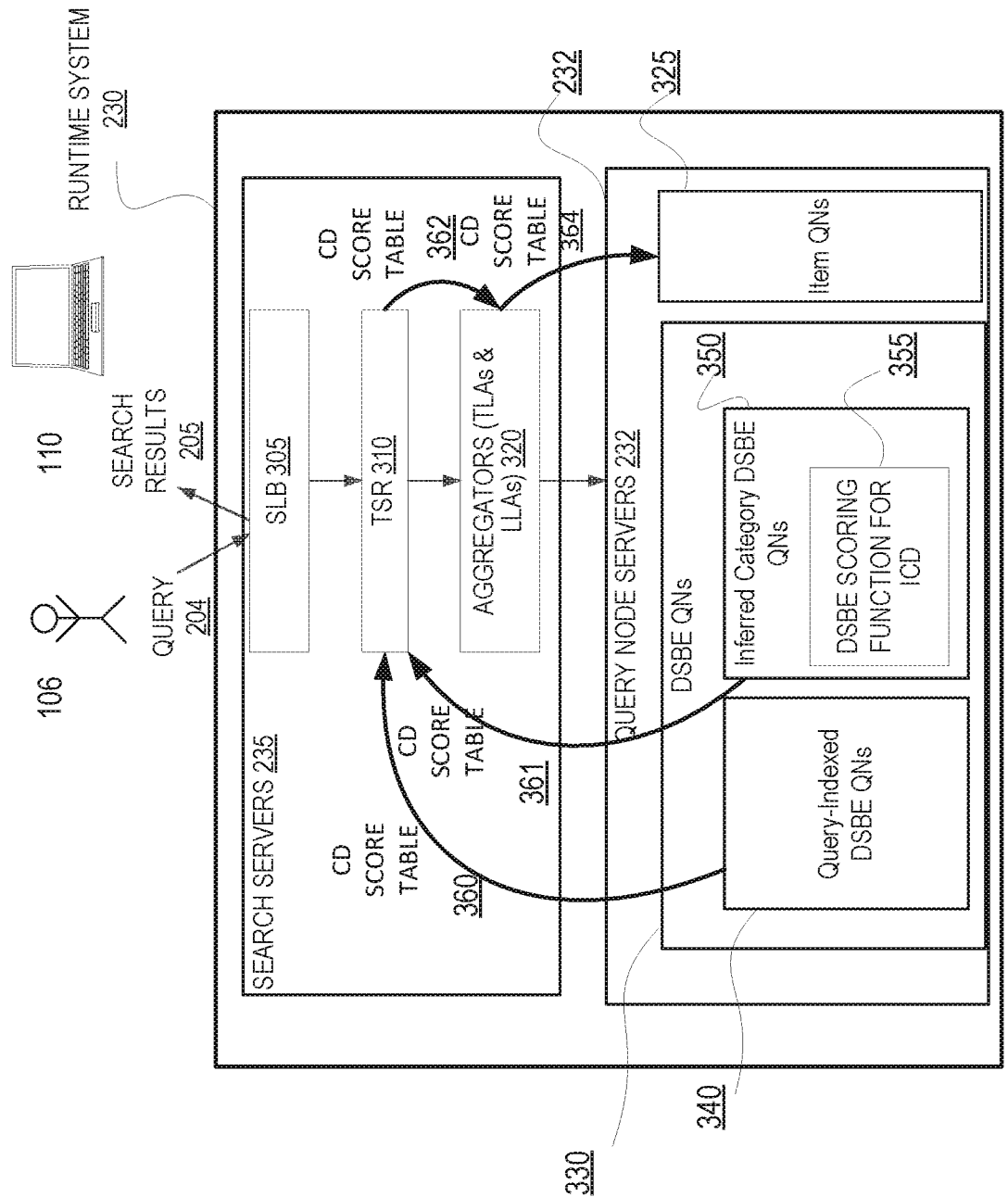
FIG. 3 illustrates a detailed block diagram of the search servers and the query node servers shown in FIG. 2A in further detail, in accordance with example embodiments.

FIG. 3 which illustrates the search servers 235 and the query node servers 232 in further detail. The architecture shown in FIG. 3 may be referred to as the query serving stack (QSS) architecture and represents many of the components in the runtime system 230. The QSS architecture is responsible for taking a query and the returning matching items in a ranked order.

The search severs 235 receive a query during runtime. The QSS architecture distributes the computations across the various item nodes 325 when processing a search query. The search servers 235 include a software load balancer (SLB) 305, a transformer (TSR) 310, and aggregators 320, which includes top level aggregators (TLA) and low level aggregators (LLA).

The computation of the dictionaries, which is performed offline (i.e., by computing the category demand tables 251 and the category relevance tables 252), operates independently of this QSS architecture. The computation of the category relevance dictionary involves the computation of a large text file offline with rows. Each row contains a site identifier (ID), query term, category, and category-query term affinity. In an example embodiment, an automatic process generates the text file every week so that the data in the category relevance dictionary stays fresh. The data used to compute the category relevance dictionary (using the category relevance tables) is based on historical user query data which may be stored as log information (e.g., log information 227 shown in FIG. 2A). The generation of the inferred relevance dictionary will be discussed in further detail below in conjunction with FIGS. 8A-8D. Data from the category relevance table 261 which was computed offline is then copied and loaded into the category relevance dictionary 225C and used by the DSBE QNs 330, more specifically, the inferred category DSBE QNs 350. For various embodiments, the DSBE QNs 330, given a query, returns matching records. The index of the DSBE QNs 330 typically maps the queries to tuples of data, for example, tuples of (category, CD ranking score) for the query.

The DSBE scoring function for ICD 355 produces CD ranking scores. Thus, the CD ranking scores represent demand for a category using either category demand (e.g., retrieved via lookup) or inferred category demand (e.g., computed via scoring function 355). The CD ranking scores in the form of a table that includes the tuples of (category, CD ranking score) are transferred to the TSR 310. This table is referred to as the CD ranking score table. The TSR 310 then transfers the CD ranking score table to the aggregators 320 for distribution to the item QNs 325.

In an example embodiment, the query-indexed DSBE QNs 340 determines the CD ranking score by looking up the query (whole query) in the category demand dictionary and returns a CD ranking score. In example embodiments, the DSBE scoring function 355 used to compute the CD ranking score for a query, is much more complex than a simple lookup in a dictionary. The DSBE scoring function for ICD is described below:

Let query q consist of tokens u1, . . . , un.
Let bi be the bigram (ui, ui+1).
Terms T=b1, . . . , bn . . . bn−1, u1, . . . , un.
If fj is a measure of category-query term affinity between a term T and category cj,
then define
$B(cj)=\text{sum}\{i:1 \ldots n-1\}fj(bi)$
$U(cj)=\text{sum}\{i:1 \ldots n\}fj(ui)$
Let U'(cj) be the sum over unigrams that are not covered by a bigram The CD ranking score is computed by the function:

$$\text{Score}(cj|q)=(2*B(cj)+U'(cj))/(nt+\text{const}*n1)$$

Where nt=number of unigram scores used+2*number of bigram scores used, $nt=\text{sum}\{i:1 \ldots n\} uvij+\text{sum}\{i:1 \ldots n-1\}2*bvij$
Where nl=number of tokens NOT covered by any bigram or unigram,
$nl=n-\text{sum}\{i:1 \ldots n\}(uvij|bvi---1,j|bvij)$
Const=1.5
Examples to compute the CD ranking score using this DSBE scoring function for ICD 355 are described in FIG. 9.

The DSBE scoring function for ICD 355 may use a normalized score, for example, the CD ranking score divided by the scores for the top 20 categories. In various embodiments, a 4× score boost is applied if the query does not have an associated category demand (e.g., found via lookup in the category demand table) and a normalized score greater than 0.1.

During runtime, two separate and independent processes are performed. One process is to retrieve the category demand for a query or to compute an inferred category demand for a query using the DSBE QNs 330. The second process is to return the matched items using the item QNs 325. The category demand scores for one or both of the category demand score or the inferred category demand score are used to rank the matched items from the search query.

The SLB 305 provides software load balancing functionality to distribute the load across the various item QNs 325. For example, the SLB 305 determines which item QNs have the least load and then determines how to distribute the search process across the different item QNs 325. As mentioned above, all information distributed to the item QNs 325 is copied into each item QN. In one example, the item QNs 325 may be implemented using the item QN grid 420 with item QNs 430 arranged in columns and rows as shown in FIG. 4. The same information is distributed to each item QN 430.

Information from the SLB 305 is passed down to the TSR 310. The TSR 310 provides functionality to better understand the query and to transform the query into more complex objects. The TSR 310 is also responsible for providing decision making functionality regarding what DSBE calls that need to be made to the DSBE QNs 330. In certain situations, rather than performing computations by the individual item QNs, the TSR 310 may offload some of that functionality by providing the information to the item QNs 325 after the computations are performed, such that individual item QNs 325 do not have to perform that computations individually.

In example embodiments, the TSR 310 has direct communications path to the DSBE QNs 330 such that the TSR 310 may make DSBE calls to the query-indexed DSBE QNs 340 to retrieve the category demand, and may make DSBE calls to the inferred category DSBE QNs 350 to retrieve the inferred category demand computed by the DSBE scoring function for inferred category demands (ICD) 355. For example embodiments, the inferred category DSBE QNs 350 provides functionality to create "arbitrary strings" for a query (e.g., bigrams and unigrams) and also provides functionality to putting back the string back together so that the category/price demand can be computed for the query. The demand for a category (including the category demand and the inferred category demand) is referred to as a CD ranking score, and a CD ranking score table is transferred directly from the query-indexed DSBE QNs 340 over path 360 to the TSR 310, and is transferred directly from the inferred category DSBE QNs 350 over path 361 to the TSR 310. The query-indexed DSBE QNs 340 and the Inferred Category DSBE QNs 350 provide the CD ranking scores in the same format such that the items QNs (which receive the CD ranking score table via paths 362) do not recognize that the scores were computed by different functions. In an example embodiment, the CD table score represents a table with less than 20 tuples of (categories, CD ranking score).

In various embodiments, the CD ranking score table (e.g., representing a table with less than 20 tuples of (categories, scores)) is transferred from the DSBE QNs 330 to the item QNs 325 via the TSR 310 using a DSBE use case query. This table is used in a regular fashion to compute inferred category relevance, also referred to inferred category demand during runtime when queries are received.

The DSBE QNs 330 given a query returns matching records. In various embodiments, an index maps queries to tuples of data stored in the category relevance dictionary 225C shown in FIG. 2B. In example embodiments, the tuples of data include site, category, query term and category-query term affinity. The lookup within the category relevance dictionary 225C is based on parts of the query (referred to as query terms) rather than the whole query. In other words, the index in the relevance dictionary 225C maps query bigrams and unigrams to documents (i.e., categories).

The category-query term affinities are stored as DSBE data and used to determine the inferred relevance of a category to a query. The category-query term affinities are stored as a document word lever documents. The category-query term affinities are evaluated in the inferred category DSBE QNs 350 by the DSBE scoring function 355 which computes the CD ranking scores for a query. The CD ranking scores, in the form of a table with tuples of (category, CD ranking scores) are provided to the item QNs 325 to be used by one or more ranking algorithms.

FIG. 4 illustrates an example of an item QN grid 420. As shown in FIG. 4, the item QN grid 420 includes a number of item QNs 430 arranged in rows and columns. The low level aggregators 410 (LLA) and the item QNs 430 locate the matching items using an index. The index lookup is done in parallel in the QNs 430. In example embodiments, the QNs 430 also rank the matched items. The category demand scores (one or both of the category demand score and the inferred category demand score) computed by the DSBE QNs are provided to the item QNs for input into the ranking algorithms used to rank the matched items.

FIG. 5A is a block diagram illustrating an example embodiment of a search system 500 including multiple modules forming at least a portion of the client-server system 100 of FIG. 1. The modules 502-514 of the illustrated search system 500 include an application interface module(s) 502, DSBE module(s) 504, a search engine module(s) 406, a data access module(s) 510, and a web-front module(s) 512. The application interface module(s) 502 includes a user-facing sub-module(s) 514, an application-facing sub-module(s) 516, and a third party-facing sub-module(s) 518. The search engine module(s) 506 includes an item searching module(s) 508, an item ranking module(s) 510, which includes a machine learning module(s) 514.

In some embodiments, the components of the search system 500 can be included in the publications system 142 of FIG. 1. However, it will be appreciated that in alternative embodiments, one or more components of the search system 500 described below can be included, additionally or alternatively, in other devices, such as one or more of the payment systems 144. In example embodiments, the search system 500 may be used to implement the runtime system 230 shown in FIG. 2A and FIG. 3.

The modules 502-514 of the search system 500 can be hosted on dedicated or shared server machines (not shown) that are communicatively coupled to enable communications between server machines. Each of the modules 502-514 are communicatively coupled (e.g., via appropriate interfaces) to each other and to various data sources, so as to allow information to be passed between the modules 502-514 of the search system 500 or so as to allow the modules 502-514 to share and access common data. The various modules of the search system 500 can furthermore access one or more databases 126 via the database server(s) 124.

The search system 500 can facilitate receiving search requests (e.g., queries), processing search queries, and/or providing search results page data to a client device 110. In a particular example, the search system 500 can facilitate computing category relevance of an arbitrary user query by the search engine modules 506. The category relevance may be measured by a CD ranking score. To this end, the search system 500 illustrated in FIG. 5 includes the application interface module(s) 502, the DSBE module(s) 504, the search engine module(s) 506, the data access module(s) 510, and the web-front module(s) 512.

The application interface module(s) 502 can be a hardware-implemented module which can be configured to communicate data with client devices. From the perspective of the search system 500, client devices can include user devices, such as the client device 110 of FIG. 1D, and/or the third party server(s) 130 of FIG. 1D. In operation, the application interface module(s) 502 can receive request messages corresponding to search requests, for example.

Figure 6:
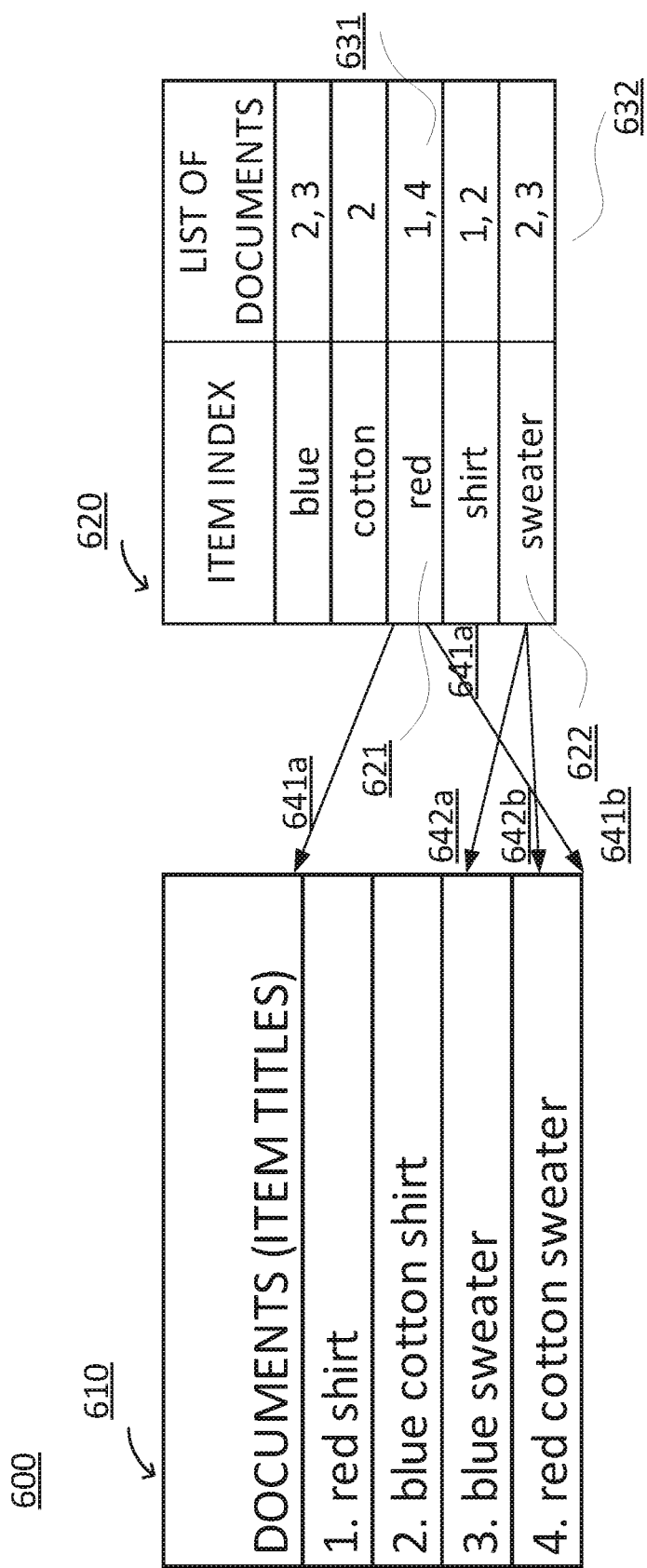
FIG. 6 illustrates, indexing a list of documents to an item in an item QN, in accordance with an example embodiment.

The search engine module(s) 506 can be a hardware-implemented module which can facilitate searching. The search engine modules 506 provide the functionality to process the search queries received. The processing of the search queries may involve the search servers 235 and the query node servers 232 as shown in FIG. 2A. In an example embodiment, the search engine modules(s) 506 can generate search results data by processing a search query in response to receiving a request from a client device via the application interface module(s) 502. In an alternative embodiment, the search engine module(s) 506 interfaces with a third-party application, such as a third-party applications 132, via the application interface module(s) 502. The item searching modules 508 may receive a query as input (via the application interface module 502) and produce a set of items matching the query using an index that maps words to documents, as shown in FIG. 6. The item ranking modules 510 compute a ranking score for the items returned from the query which is used to rank the items returned by the item searching modules 508 from the query.

Figure 5B:
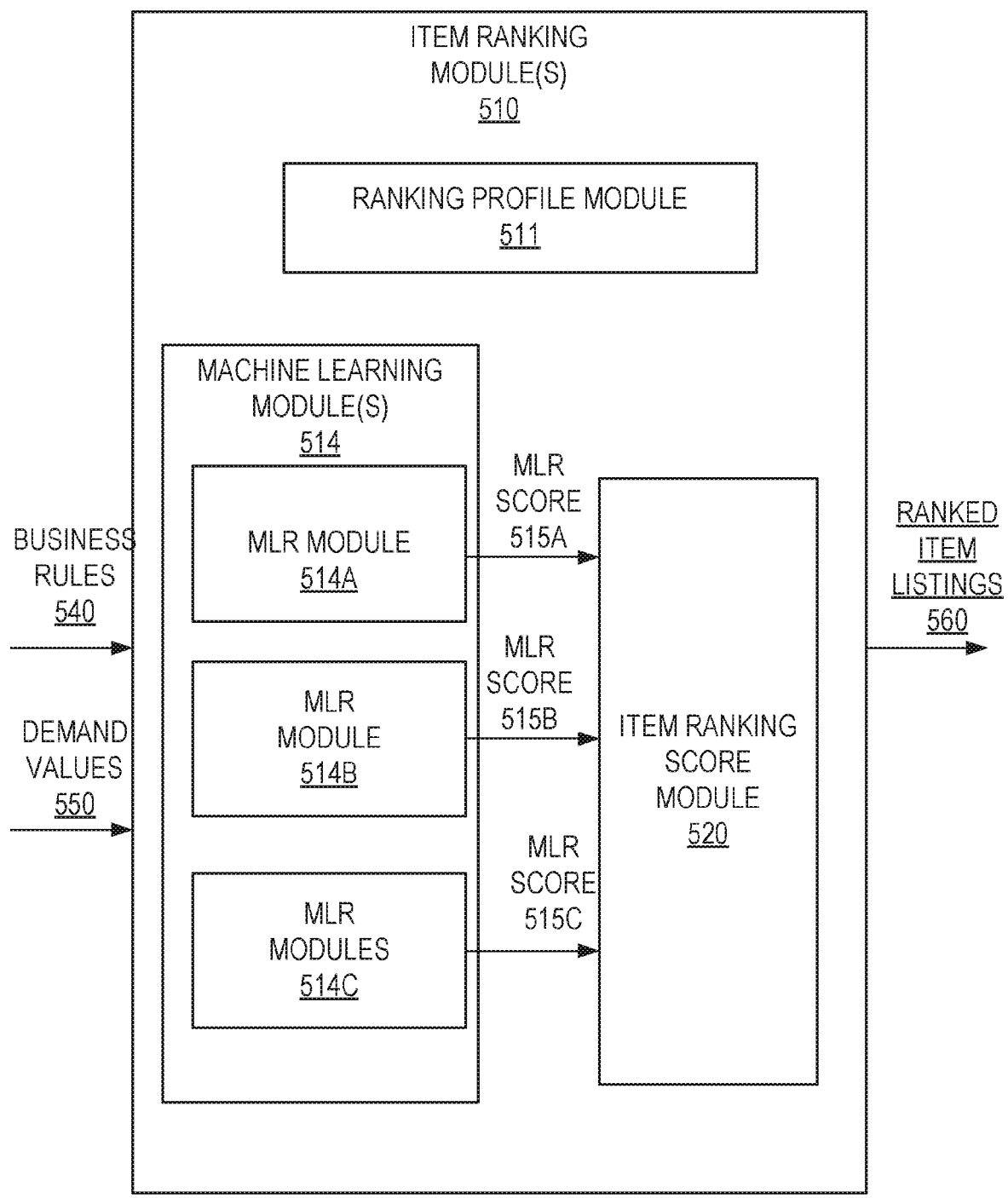
FIG. 5B illustrates a block diagram of the item ranking modules shown in FIG. 5A in further detail, in accordance with an example embodiment.

In various embodiments, machine learning modules 514 are used to compute the ranked search results for a query. The machine learning modules are trained offline using various sample data. Various inputs into one or more of the machine learning modules 514 include price demand and category demand (which may be inferred). The machine learning modules 514 represent a number machine learning algorithms, each trained to compute a different machine learned ranking (MLR) scores. The MLR scores generated by the machine learning modules 514 are used to compute the ranking score for the search results. FIG. 5B illustrates the item rankings modules 510, which includes the machine learning modules 514, in further detail. FIG. 5B illustrates an example of the item ranking modules 510. The item ranking module 510 includes a ranking profile module 511 for a site. The profile is used to identify the information used by the item ranking modules 510, in particular, the inputs (e.g., demand values 550 and other query features) into the machine learning modules 514 and the business rules 540 used to compute ranking score for producing the ranked item listings 560, or ranked search results. The business rules 540 may be include some MLR rules and some that are not MLR rules in example embodiments. The demand values 550 provided as input to the item ranking modules may represent CD ranking scores or CD ranking tables. The machine learning modules 514 shows examples of machine learning ranking (MLR) modules. The MLR module 514 produces the MLR 515A, the MLR module 514B produces the MLR score 515B, and the MLR modules 514C produces the MLR score 515C. The MLR scores 151A-C are received as inputs into the item ranking score module 520 that generates the ranking score for the matched items. The item ranking modules 510 produces the ranked item listings 560, which represents the search results in a ranked order.

In an example embodiment, the search results data can correspond to a list of items. Additionally, the search results data can further correspond to ranking data that is suitable for ranking the items. For example, the search results data can include a ranking score for each of the items of the search results. Additionally or alternatively, the items of the search results can be provided in an order that is indicative of their rankings, for example, ordered from most relevant to least relevant or ordered from least relevant to most relevant. Accordingly, an example embodiment can provide an ordered search results list and can thus omit explicit ranking value data.

Furthermore, the search results data can additionally correspond to one or more attribute-value pairs for each of the items of the search results data. For example, each item can correspond to an item of an online marketplace and can have data that indicates the brand, seller, item condition, price, color, type/sub-type, and/or the like attributes usable to characterize, filter, and/or search for the item.

The data access module(s) 510 can be a hardware-implemented module which can provide data storage and/or access. Search results data can be stored in or retrieved from the database 126 via the data access module(s) 510.

For example, the data access module(s) 510 can access the search results data. As used herein, the operation of accessing includes receiving the search results data from the search engine directly and can also include accessing a data memory device storing the search results data. As such, the data access module(s) 510 can interface with the database 126 of FIG. 1.

Additionally, the data access module(s) 510 may be used to retrieve information requested by the offline system 240. For example, the offline system 240 retrieves log information 227 (via the data access module(s) 510) from the databases 126 to compute the dictionary information 225. As such, the data access module(s) 510 can interface with the offline system 240 shown in FIG. 2.

The web-front module(s) 512 can be a hardware-implemented module which can provide data for displaying web resources on client devices. For example, the search system 500 can provide a webpage for displaying the search results data.

The DSBE 504 may include the dictionary information 225 and the DSBE QNs 330. The dictionary information 225 is described in further detail in conjunction with FIG. 2A and FIG. 2B. The DSBE QNs 330 mare described in further detail in conjunction with FIG. 3.

Referring now to FIG. 6, an example 600 of using an index in an item QN is shown. For the example shown in FIG. 6, a query "red sweater" is received. A list of documents 610 is referred to be item titles. There are four documents shown in the list 610. A list of item indexes 620 is also shown. Each word in the list of item indexes 620 is associated with a list of documents. For the query "red sweater" there are two words red 621 and sweater 622 that are associated with a list of documents. A list 631 is associated with the word red 621. A list 632 is associated with the word sweater. The list 631 includes the documents red shirt and red cotton sweater. The list 632 includes the documents blue sweater and red cotton sweater. In this example, the red cotton sweater appears on both lists 631 and 632 such that the query "red sweater" returns item 4 which is the red cotton sweater.

As mentioned above, the item QNs compute a ranking of the search results. The item QNs receive a query as input and produces a set of items matching the query. An index is used to find items by mapping words to documents. Items are matched using the words of the query. Referring to FIG. 6, the arrow 641a maps the word red 621 to item 1 (red shirt) and the arrow 641b to item 4 (red cotton sweater). Also shown in FIG. 6, the arrow 642a maps the word sweater 622 to the item 3 (blue sweater) and the arrow 642b maps the word sweater 622 to item 4 (red cotton sweater). In this example, the set of items matching the query only includes one item, item 4 (red cotton sweater). For each returned item, the item QN then computes a ranking score. In various embodiments, the higher the ranking score, the better the match between the items (e.g., documents) and the query (based on the words of the query). In example embodiments, the items are ranked by score and the item QNs return the set of items, together with their ranking score.

Figure 7:
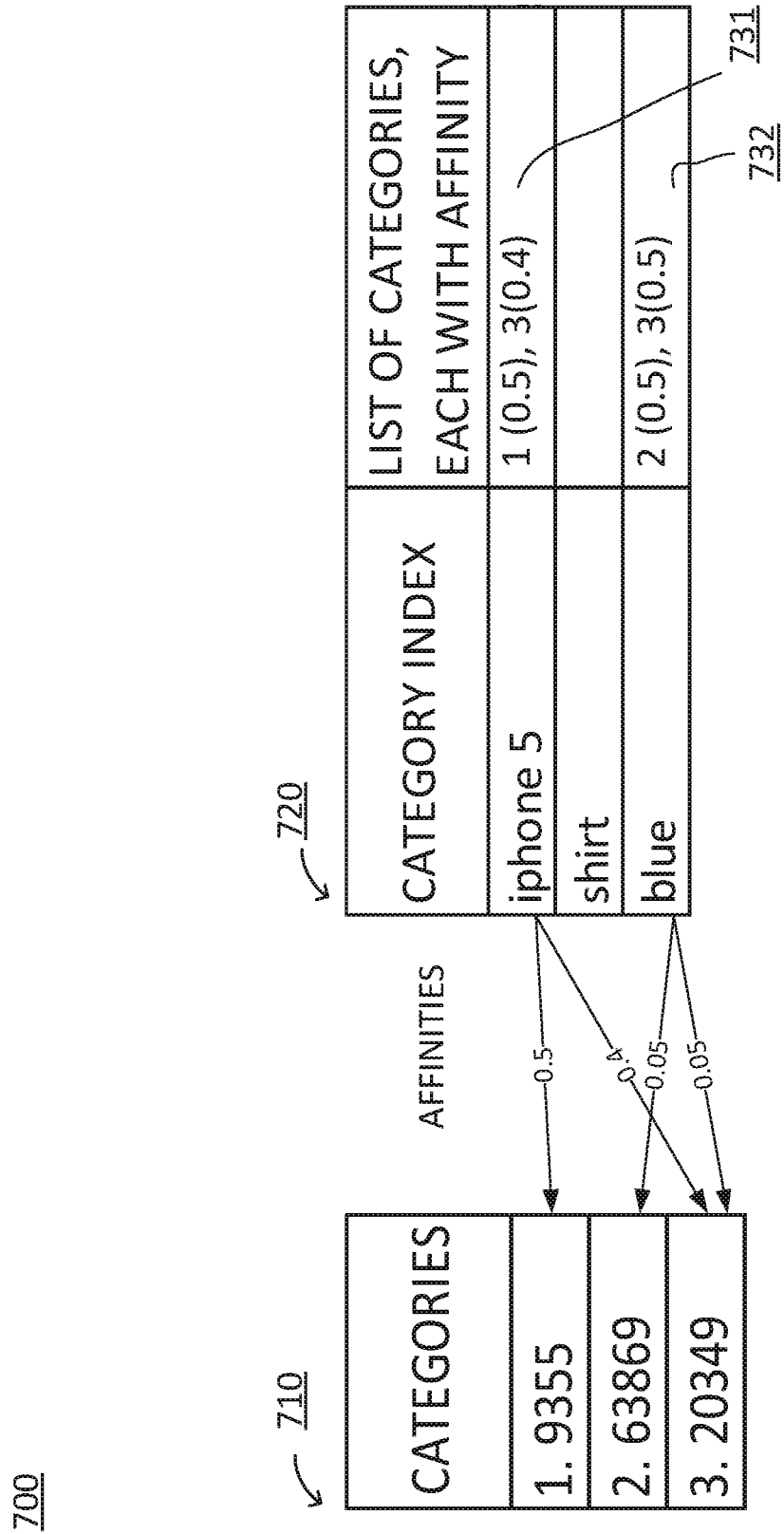
FIG. 7 illustrates indexing a list of categories, each with an affinity, to a category in a DSBE QN, in accordance with an example embodiment.

FIG. 7 illustrates an example of using an index in the inferred category DSBE QNs 350. In example 700, a query "iphone 5 blue" is received. The query terms for this query include iphone 5, 5 blue, iphone, 5 and blue. The example 700 includes a list 710 of categories and a list 720 of category indexes representing words (i.e., bigrams and unigrams). When a runtime system (e.g., runtime system 230 shown in FIG. 3) receives a query, the inferred category DSBE QNs 350 return the three categories 9355, 63869, and 20349. Each of the unigrams and bigrams has a list of categories, each with category-query term affinity. FIG. 7 shows a list 731 associated with the category index iphone 5 and a list 732 associated with the category index blue. Each category in the list is separated by a comma, and the associated category-query term affinity is shown in the parenthesis. The relevant category-query term affinities are shown by the arrows from the category index 720 to the categories 710.

FIGS. 8A-8D illustrate various tables used to compute the category-query term affinities, according to example embodiments. FIG. 8A illustrates a query-category count table 800 and a query term-category count table 820 according to an example embodiment.

The query-category count table 800 illustrates a number of query-category pairs. Three queries (Q1, Q2 and Q3) are shown in the table 800. A row is created for each category-query-pair. In the example shown in the table 800, the query "front fenders" is has two rows, one for category 33644 and one for category 72569. The view items counts correspond to each category-query pair.

The query term-category count table 820 includes category-query terms pairs with the corresponding view item count. The queries Q1, Q2, and Q3 are each disassembled into query terms that represent either a bigram or a unigram. A row in the table 820 is computed for each category-query term-pair. In the example shown in the table 820, the query term "front fenders" is has two rows, one for category 33644 and one for category 72569. The arrows 801, 802, 803 show mappings from the table 800 to the table 820. The query term "front fenders" represents a query term from in all three queries (Q1, Q2, and Q3). The view item counts associated with the category 33644 from the table 800 from queries that include the term "front fenders" is mapped (as shown by arrows 801, 802, 803) into the table 820 into the first row 804 which includes the query term-category pair (front fenders, 33644). The view item count for row the query term-category pair (front fenders, 33644) is 420, which represent the sum of the view item counts 395, 10, and 15 from the table 800. Thus, FIG. 8A illustrates extracting query-terms from a number of queries by categories and the aggregating the view item counts for the query terms for all the queries by categories.

FIG. 8B illustrates the query term-category count table 820 and a total view item count per term table 840 according to an example embodiment. The arrows 806 and 807 illustrate that rows 804 and 805 from the table 820 are aggregated into the row 808 in the table 840. The rows in the total view item count per term table 840 aggregates all the query terms regardless of the category. The view item count 455 shown in row 808 of the table 840 is the sum of the view item counts from the row 804 for category 33644 and the row 805 for the category 72569. Thus, FIG. 8B illustrates aggregating the view item counts across relevant categories query term. The view item counts from the query-term category count table 820 and the total view item count per term table 840 are used to compute the category-query term affinities as shown in FIG. 8C.

FIG. 8C illustrates a table 860 used to compute the category-query term affinities. The view item counts from the table 820 are shown in column 861 of the table 860, and the view item counts from the table 840 are shown in the column 862 of the table 860. The values shown in columns 861 and 862 are used to compute the category-query term affinity shown in column 863. The values in column 861 represent the numerator and the values in the column 862 represent the denominator of the category-query term affinity shown in column 863.

FIG. 8D illustrates a table 890 that represents an example of a category relevance dictionary. The rows in the table include site, category, query term and category-query term affinity.

FIG. 9 illustrates two example of computing the CD ranking score based on the function: Score $(cj|q)=(2*B(cj)+U'(cj))/(nt+const*nl)$. The variables and constants for this function are described above. For these examples that illustrate the scoring function according to example embodiments, the query used is "double electrical socket spacer" and the relevant category is 73954. In the Example 1, the CD ranking score is computed by the calculation 910. The table 920 shows the values used in the calculation 910. In the Example 2 the CD ranking score is computed by the calculation 930. The table 940 shows the values used in the calculation 930.

For the example 1, one bigram and one unigram were identified as having a category-query term affinity. Since the unigram does not represent a non-overlapping unigram, because the unigram "electrical" is included within the bigram "electrical socket," the unigram "electrical" is not used in to compute the CD ranking score. The arrows 921-923 show where the values in the formula 910 are derived from the table 920. The arrows 924 and 925 are used to indicate the constants in the formula 910.

For the example 2, two bigrams and one unigram were identified as having a category-query term affinity. Since the unigram does not represent a non-overlapping unigram, because the unigram "electrical" is included within the bigram "electrical socket," the unigram "electrical" is not used in to compute the CD ranking score. The arrows 941-944 show where the values in the formula 930 are derived from the table 940. The arrows 945 and 946 are used to indicate the constants in the formula 930.

FIGS. 10-14 illustrate flow diagrams describing example methods for computing category relevance for a query. The example methods 1000-1400 will be described below, by way of explanation, as being performed by certain modules, components or systems. It will be appreciated, however, that the operation of the example methods can be performed by any suitable order by any number of modules, components or system shown in FIGS. 1A, 2A, 2B, 3, 4, 5A, and 5B.

Figure 10:
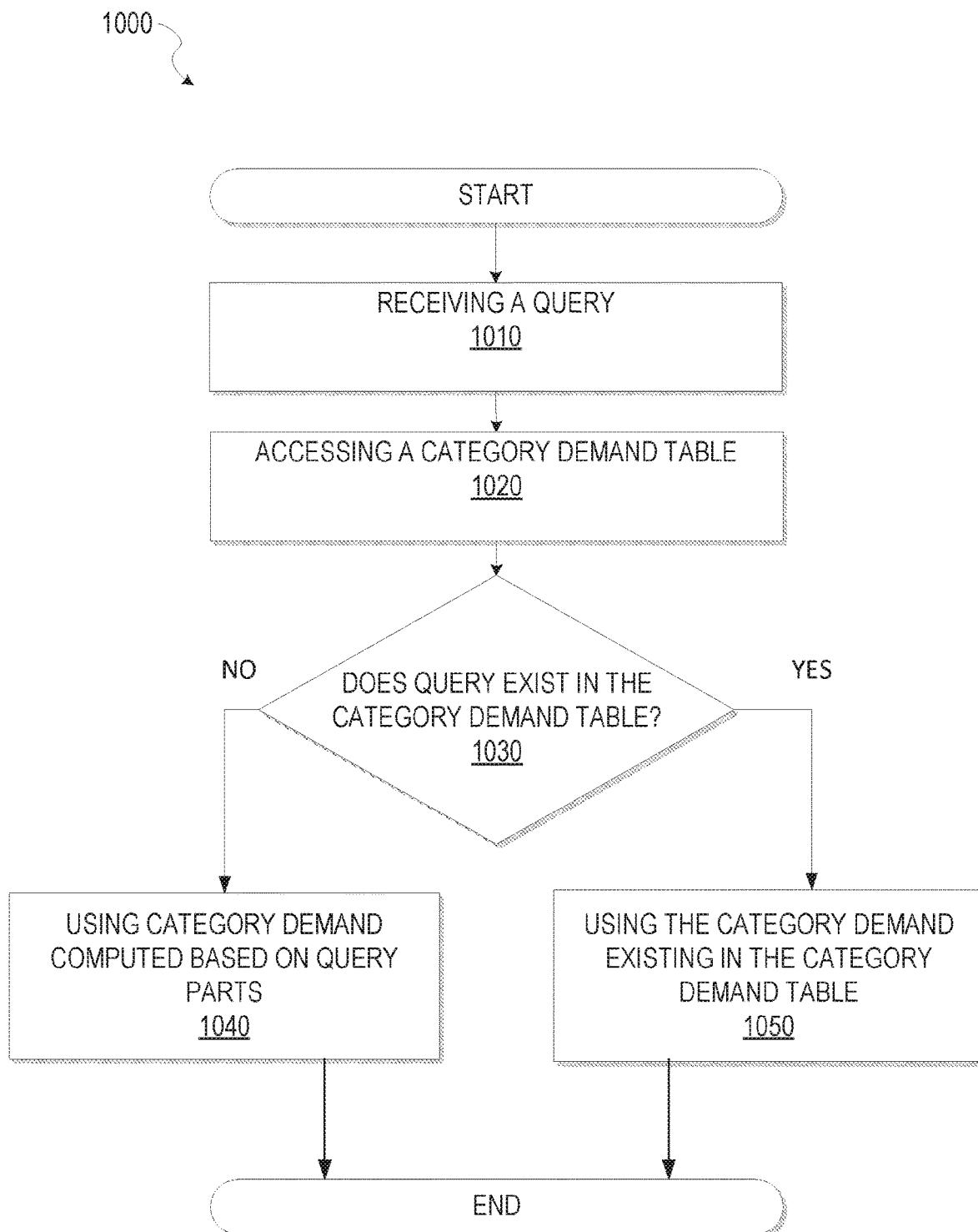
FIG. 10 is a flow diagram 1000 illustrating a method for computing category demand for a query using the whole query or query parts, in accordance with example embodiments.

FIG. 10 is a flow diagram 1000 illustrating a method for computing category demand for a query using the whole query or query parts in accordance with example embodiments. The whole query is used to compute the category demand if the frequency of that query by past users provides sufficient historical data to compute a category demand. The query parts of a query are used to compute an inferred category demand if the frequency of that query by past users does not provide sufficient historical data to compute the category demand from the whole query.

The method shown in FIG. 10 includes operations 1010-1040. At operation 101 a query is received by a runtime system. The runtime system may a publication system 142 that provide an e-commerce site, for example. The query received typically includes a number of words that can be separated into query terms which are unigrams or bigrams. A query term represents a part of a whole query. At operation 1020, a category demand table is accessed. The category demand table may be referred to as a category demand dictionary and stored in a database (e.g., databases 126) that is accessible to DSBE QNs 330 for lookup. An example category demand table includes information for site, category, query, and category demand. The category demand may be referred to as CD ranking score.

At operation 1030, a determination is made whether a category demand for the query is stored in the category demand table. Operation 1030 may involve performing a lookup using the whole query in the category demand table and finding one or more category demands for the query. In an example embodiment, the query-indexed DSBE QNs 340, shown in FIG. 3, performs the lookup. If a category demand for the query exists in the table, the category demand identified in the table is used, as shown at operation 1050.

If a category demand for the query does not exist in the category demand table, then category demand is computed at operation 1040. At operation 1040, the category demand is computed based on query parts. The category demand computed at operation 1040 may represent an inferred category demand. In an example embodiment, inferred category demand is computed by the DSBE scoring function for ICS 335 shown in FIG. 3. The method describe FIG. 3 uses both category demand and an inferred category demand, depending on whether there is an existing category demand (or CD ranking score) computed by the runtime system based on the frequency of that query.

For alternative embodiments, category demand based on query parts is computed for all queries, regardless of the query frequency (from historical query data). In other words, category demand based on query parts is not computed is not just computed for tail queries, but all queries received, even if category demand can be computed based on historical query data.

Figure 11:
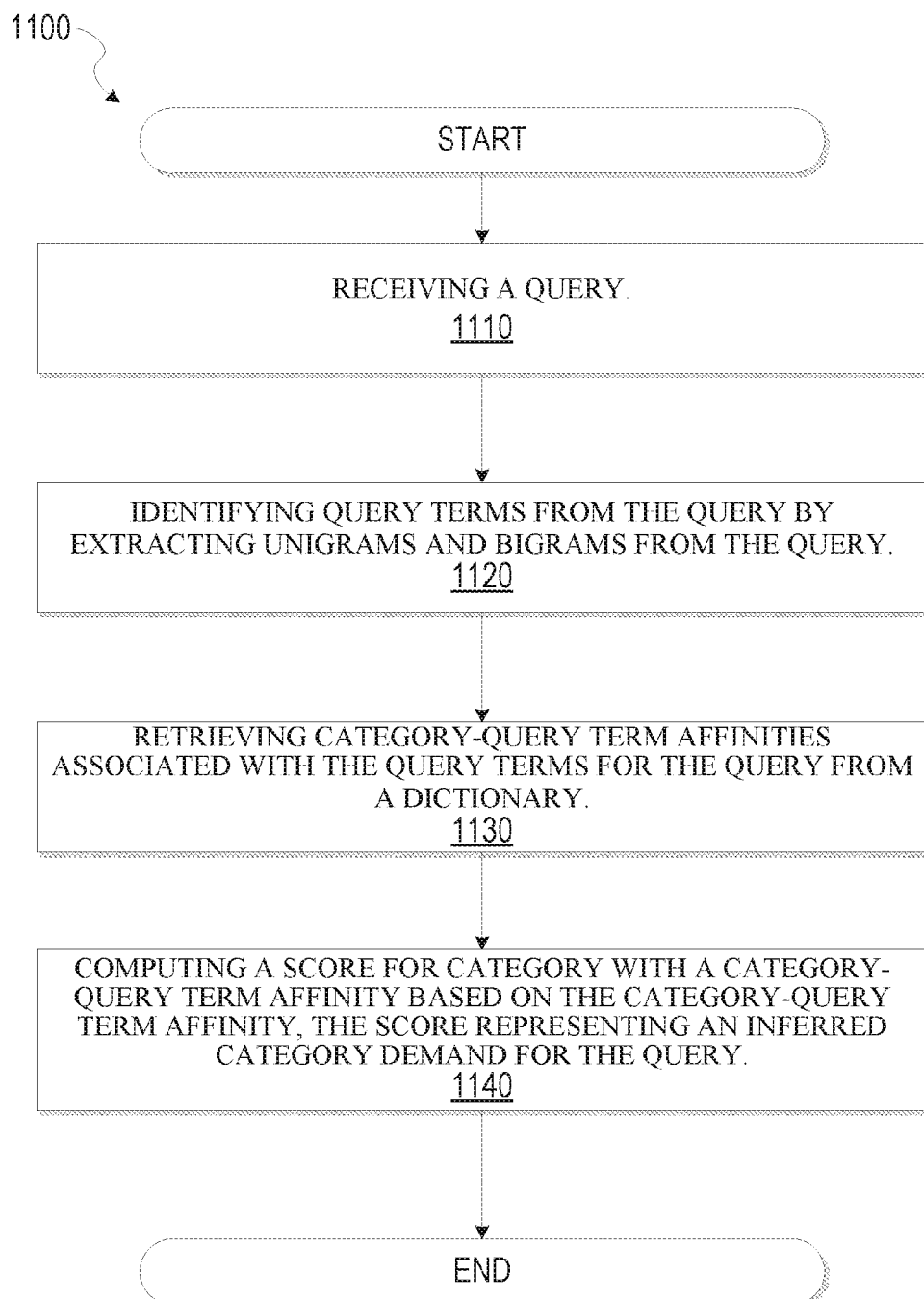
FIG. 11 is a flow diagram 1100 illustrating a method for an inferred category demand for a query, in accordance with example embodiments.

FIG. 11 is a flow diagram 1100 illustrating a method for an inferred category demand for a query in accordance with example embodiments. The method described in FIG. 11 computes an inferred category demand for a query regardless of the frequency of that query from past users. The flow diagram 1100 includes operations 1110-1140.

At operation 1110 a query is received from a runtime system. The query received includes a string of words that can be disassembled into unigrams and bigrams referred to as query terms. At operation 1120, the query terms from the query are identified by extracting the unigrams and bigrams from the query. At operation 1130, the category-query term affinities for the query terms in the query are retrieved from a dictionary. In an example embodiment, the dictionary may be an inferred relevance dictionary 225C. The category-query term affinities are computed offline and copied into the dictionary to be accessed during runtime when a query is received. At operation 1140, a score is computed for each category with a category-query term affinity based on the category query term affinity. Thus, a list of category-score pairs are computed for each query. The score computed in 1140 represents an inferred category demand for the query. In example embodiments, the DSBE scoring function for ICD 355 (shown in FIG. 3) computes the inferred category demand score.

For alternative embodiments, an arbitrary query is received. Matching item listings for the arbitrary query from a first database is identified. The first database stores item listings. Assigned probabilities based on historical queries for the arbitrary query is retrieved from a second database. The assigned probabilities is based on a probability model for a query feature. A score for the query feature based on the assigned probabilities for the arbitrary query is computed. For an example embodiment, the operation of computing the score comprises generating conditional probability by applying Bayes rule to the query feature. The score is provided to at last one machine learning module to generate a ranking score. For a further embodiment, the query feature represents a category demand for the arbitrary query. In another embodiment, the probability model for the category demand represents a model for each category over a vocabulary of query terms for the arbitrary query. In another example embodiment, the assigned probabilities represent category-query term affinities to a measure of the strength between query terms and categories.

Figure 12:
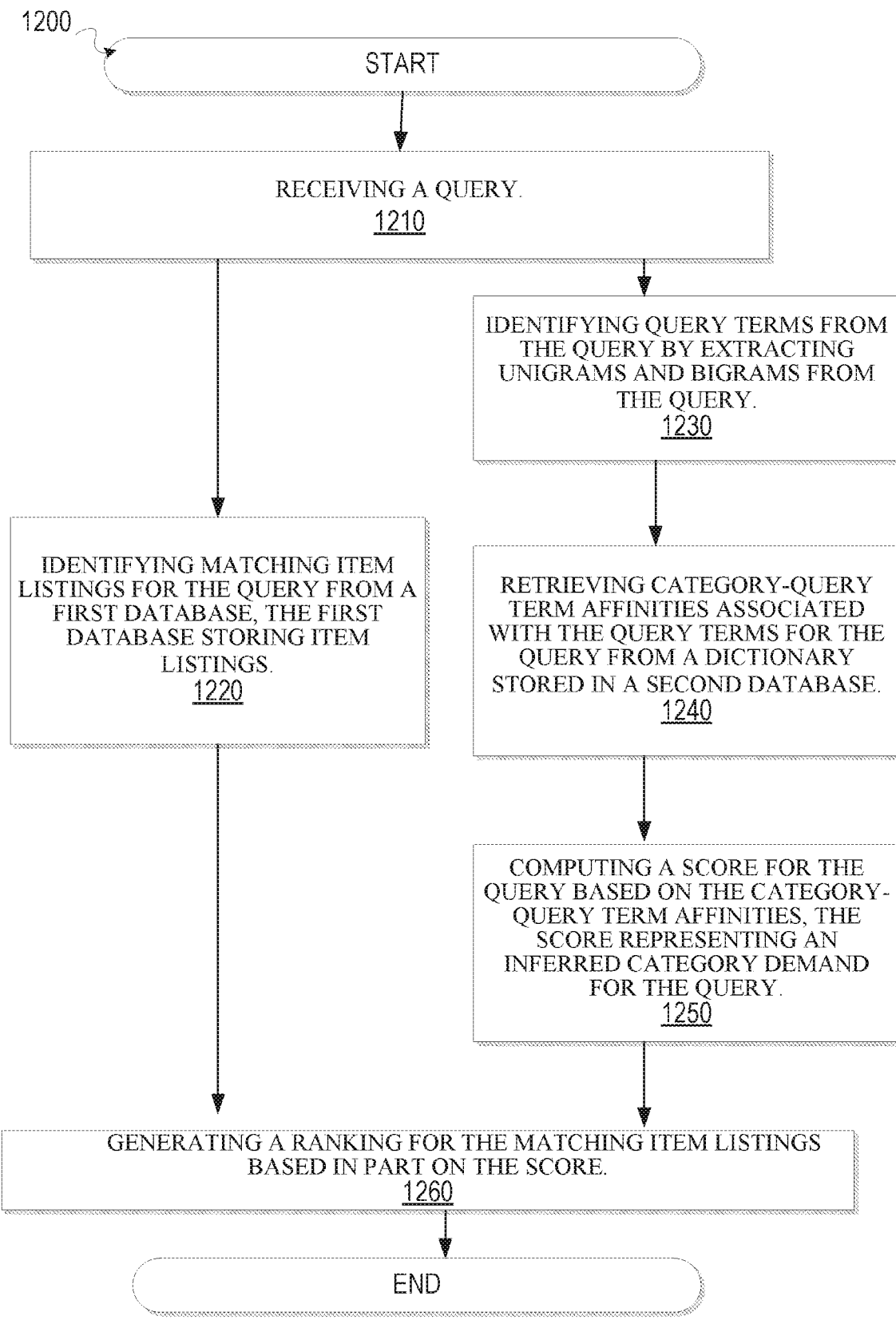
FIG. 12 is a flow diagram 1200 illustrating a method for generating ranked search results using an inferred category demand, in accordance with example embodiments.

FIG. 12 is a flow diagram 1200 illustrating a method for generating ranked search results using an inferred category demand in accordance with example embodiments. At operation 1210, a query is received. The query received is processed by two independent processes during runtime.

The first process is to compute an inferred category demand for a query using the DSBE QNs 330 (shown in FIG. 3). The operations 1230, 1240, and 1250 are used to implement the first process. At operation 1230, query terms from the query are identified by extracting bigrams and unigrams from the query. At operation 1240, the category-query term affinities associated with the query terms for the query are retrieved from a dictionary stored in a second database. In example embodiment, the dictionary may represent the inferred relevance dictionary 225C shown in FIG. 2B. At operation 1250, a score for the query based on the category-query term affinities are computed. The score represents the inferred category demand for the query.

The second process is to return the matched items using the item QNs 325 (shown in FIG. 3). The operation 1220 is used to implement the second process. At operation 1220, matching item listings for the query are retrieved from a first database storing the item listings. At operation 1260, the items found by the first process are ranked by a ranking algorithm that uses the score computed by the second process. In other words, a ranking for the matching item listings is generated, based in part, on the score.

Figure 13:
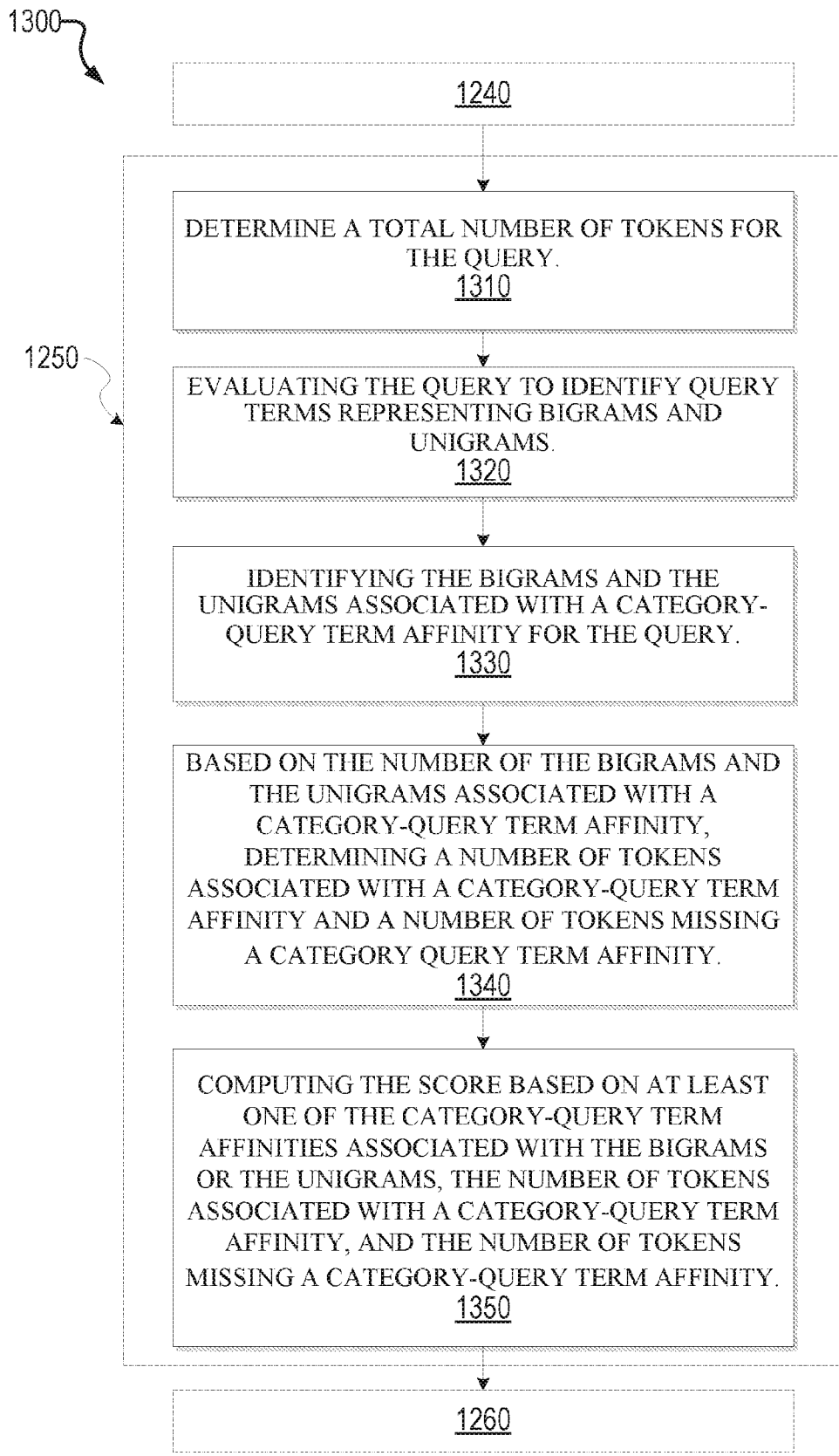
FIG. 13 illustrates a flow diagram 1300 illustrating a method describing sub-operations of the operation 1250 shown in FIG. 12 to compute the category demand (CD) score, in accordance with example embodiments.

FIG. 13 illustrates a flow diagram 1300 illustrating a method describing sub-operations of the operation 1250 shown in FIG. 12 to compute the inferred category demand in accordance with example embodiments. The flow diagram 1300 is performed during runtime after a query is received. At operation 1250 the score representing the inferred category demand for the query is computed. The operation 1250 includes the sub-operations 1310, 1320, 1330, 1340, and 1350. At operation 1310 a total number of tokens for a query is determined. At operation 1320, the query is evaluated to identify query terms representing bigrams and unigrams. At operation 1330, the bigrams and unigrams associated with a category-query term affinity is identified. At operation 1340, determining a number of tokens associated with a category-query term affinity and a number of tokens missing a category-query term affinity based on the number of the bigrams and unigrams. At operation 1350, computing the score based on at least one of the category-query term affinities associated with the bigrams or unigrams, the number of tokens associated with a category-query term affinity and the number of tokens missing a category-query term affinity. For some embodiments, the unigrams may represent non-overlapping unigrams.

Figure 14:
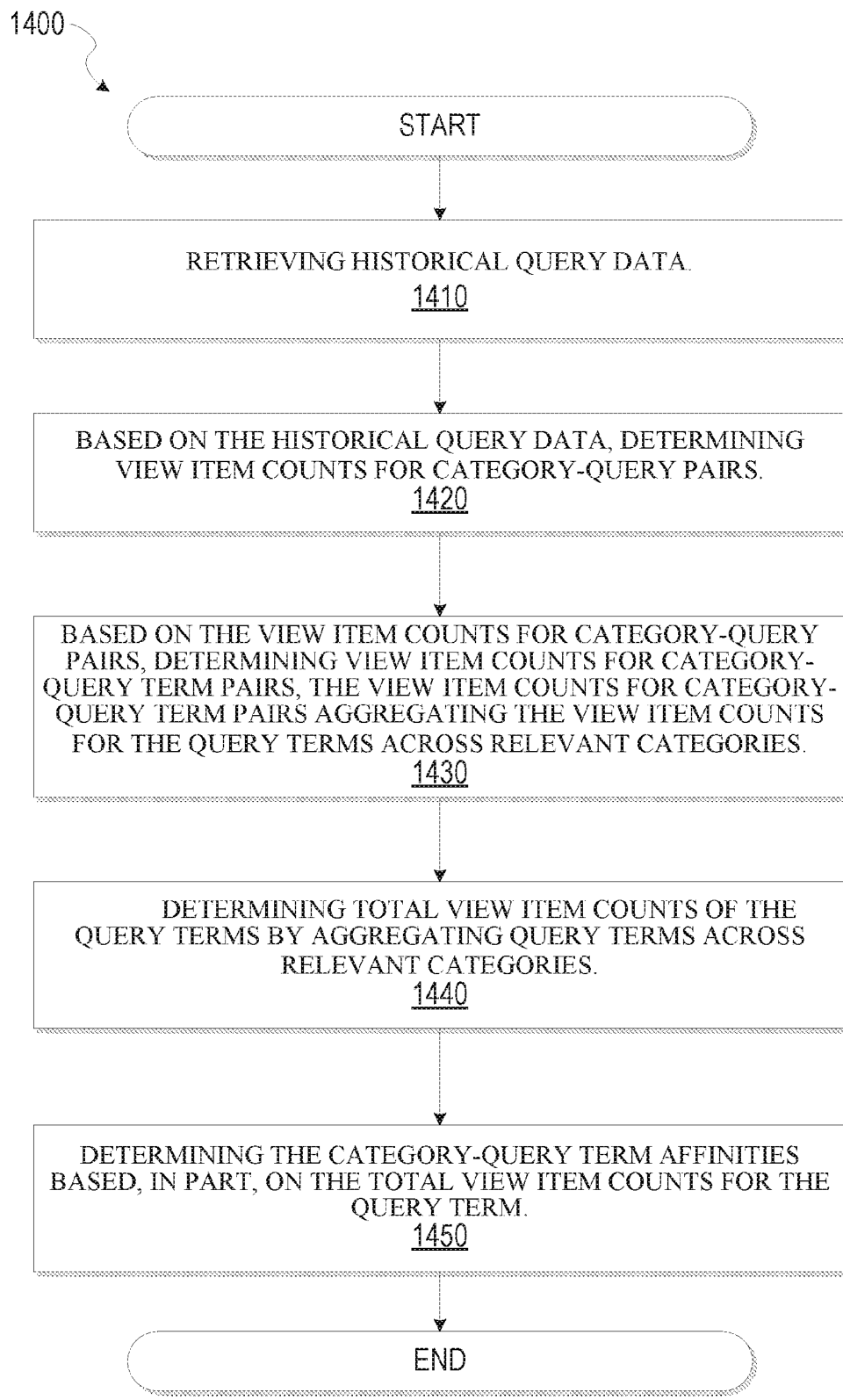
FIG. 14 illustrates a flow diagram 1400 illustrating a method of generating a category relevance table offline, in accordance with example embodiments.

FIG. 14 illustrates a flow diagram 1400 illustrating a method of generating a category relevance table offline in accordance with example embodiments. The flow diagram 1400 includes operations 1410-1450. At operation 1410, history query data is retrieved. In example embodiments, the history query data may be stored in the databases 126 as log information 227 shown in FIG. 2A. At operation 1420, based on the historical query data, determining view items counts for query-category pairs. At operation 1430, determining view items counts for query term-category pairs based on the view items counts for the query-category pairs. The view items counts for the query term-category pairs aggregating the view item counts for the query terms across relevant categories. At operation 1440, determining the total view items counts of the query terms by aggregating query terms across relevant categories. At operation 1450, determining the query term-category affinities based, in part, on the total view item counts for the query term.

Although the flow diagrams 1100, 1200, 1300, and 1400 are used to describe the query feature for category demand, and more specifically, an inferred category demand, various embodiments may be extended to other query features. Other dictionaries may be computed for other query feature and accessible to a search system when a search query is received. For an arbitrary query, probabilities may be assigned based on historical data. The probabilities may be based on parts or segmentations of queries, rather than whole queries. In example embodiments, queries may be segmented by unigrams, bigrams, trigrams, and other arbitrary text segments. In further embodiments, a combination of two or more different types of text segments may be used. A score is then computed for the query feature based on the assigned probabilities for the arbitrary query. The score is then used by one or more machine learning algorithms used for ranking items.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-5 and 10-14 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 15:
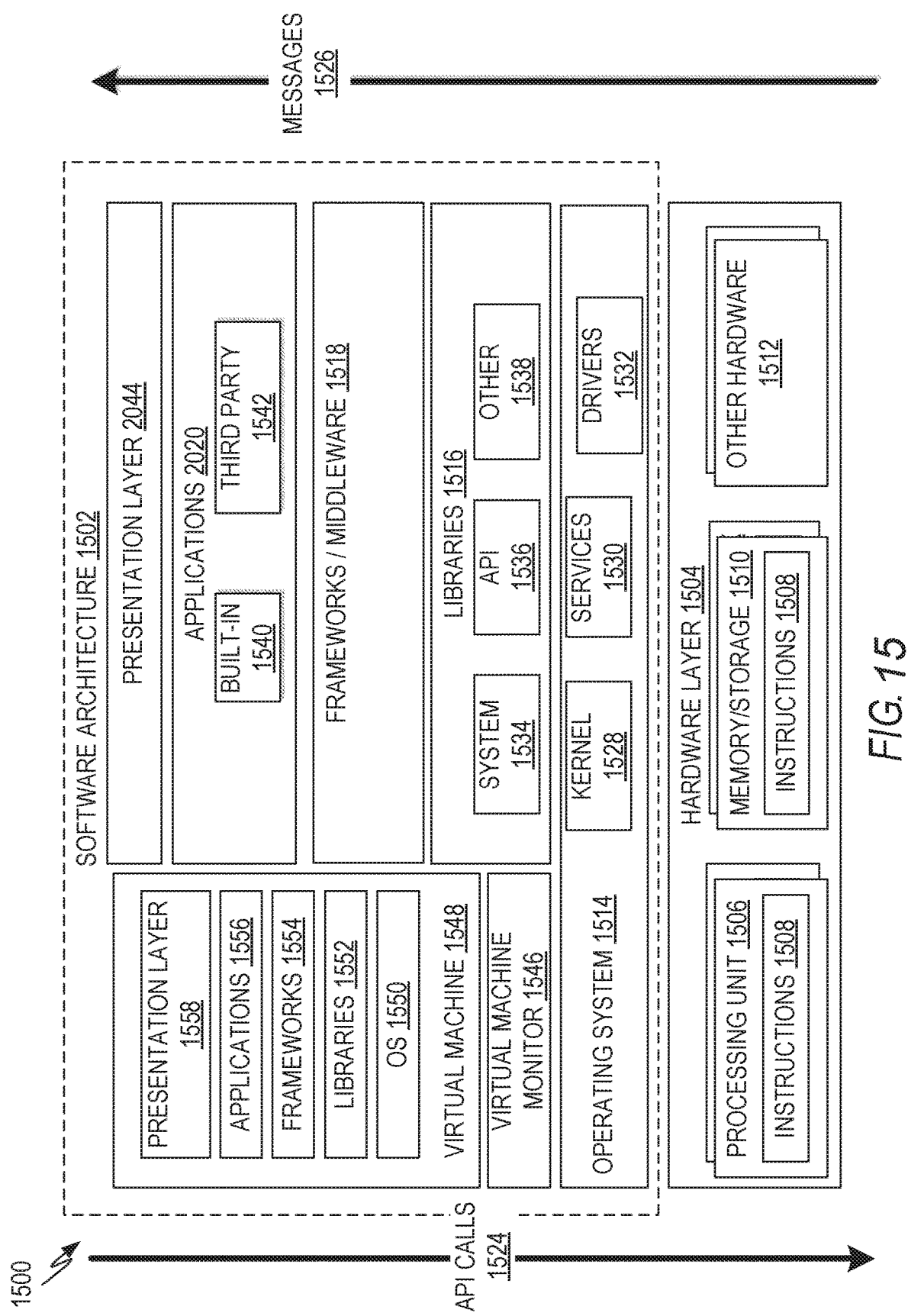
FIG. 15 is a block diagram illustrating an example of a software architecture that may be installed on a machine, according to some example embodiments.

FIG. 1—is a block diagram 1500 illustrating a representative software architecture 1502, which may be used in conjunction with various hardware architectures herein described. FIG. 15 is merely a non-limiting example of a software architecture and it will be appreciated that many other architectures may be implemented to facilitate the functionality described herein. The software architecture 1502 may be executing on hardware such as machine 1600 of FIG. 16 that includes, among other things, processors 1610, memory 1630, and I/O components 1650. A representative hardware layer 1504 is illustrated and can represent, for example, the machine 1600 of FIG. 16. The representative hardware layer 1504 comprises one or more processing units 1506 having associated executable instructions 1508. Executable instructions 1508 represent the executable instructions of the software architecture 1502, including implementation of the methods, modules and so forth of FIGS. 1-5 and 10-14. Hardware layer 1504 also includes memory and/or storage modules 1510, which also have executable instructions 1508. Hardware layer 1504 may also comprise other hardware as indicated by 1512 which represents any other hardware of the hardware layer 1504, such as the other hardware illustrated as part of machine 1600.

In the example architecture of FIG. 15, the software 1502 may be conceptualized as a stack of layers where each layer provides particular functionality. For example, the software 1502 may include layers such as an operating system 1514, libraries 1516, frameworks/middleware 1518, applications 1520 and presentation layer 1522. Operationally, the applications 1520 and/or other components within the layers may invoke application programming interface (API) calls 1524 through the software stack and receive a response, returned values, and so forth illustrated as messages 1526 in response to the API calls 1524. The layers illustrated are representative in nature and not all software architectures have all layers. For example, some mobile or special purpose operating systems may not provide a frameworks/middleware layer 1518, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1516 may provide a common infrastructure that may be utilized by the applications 1520 and/or other components and/or layers. The libraries 1516 typically provide functionality that allows other software modules to perform tasks in an easier fashion than to interface directly with the underlying operating system 1514 functionality (e.g., kernel 1528, services 1530 and/or drivers 1532). The libraries 1516 may include system 1534 libraries (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks 1518 (also sometimes referred to as middleware) may provide a higher-level common infrastructure that may be utilized by the applications 1520 and/or other software components/modules. For example, the frameworks 1518 may provide various graphic user interface (GUI) functions, high-level resource management, high-level location services, and so forth. The frameworks 1518 may provide a broad spectrum of other APIs that may be utilized by the applications 1520 and/or other software components/modules, some of which may be specific to a particular operating system or platform.

The applications 1520 includes built-in applications 1540 and/or third party applications 1542. Examples of representative built-in applications 1540 may include, but are not limited to, a contacts application, a browser application, a book reader application, a location application, a media application, a messaging application, and/or a game application. Third party applications 1542 may include any of the built in applications as well as a broad assortment of other applications. In a specific example, the third party application 1542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1542 may invoke the API calls 1524 provided by the mobile operating system such as operating system 1514 to facilitate functionality described herein.

The applications 1520 may utilize built in operating system functions (e.g., kernel 1528, services 1530 and/or drivers 1532), libraries (e.g., system 1534, APIs 1536, and other libraries 1538), frameworks/middleware 1518 to create user interfaces to interact with users of the system. Alternatively, or additionally, in some systems interactions with a user may occur through a presentation layer, such as presentation layer 1544. In these systems, the application/module "logic" can be separated from the aspects of the application/module that interact with a user.

Some software architectures utilize virtual machines. In the example of FIG. 15, this is illustrated by virtual machine 1548. A virtual machine creates a software environment where applications/modules can execute as if they were executing on a hardware machine (such as the machine of FIG. 16, for example). A virtual machine is hosted by a host operating system (operating system 1514 in FIG. 16) and typically, although not always, has a virtual machine monitor 1546, which manages the operation of the virtual machine as well as the interface with the host operating system (i.e., operating system 1514). A software architecture executes within the virtual machine such as an operating system 1550, libraries 1552, frameworks/middleware 1554, applications 1556 and/or presentation layer 1558. These layers of software architecture executing within the virtual machine 1548 can be the same as corresponding layers previously described or may be different.

Example Machine Architecture and Machine-Readable Medium

Figure 16:
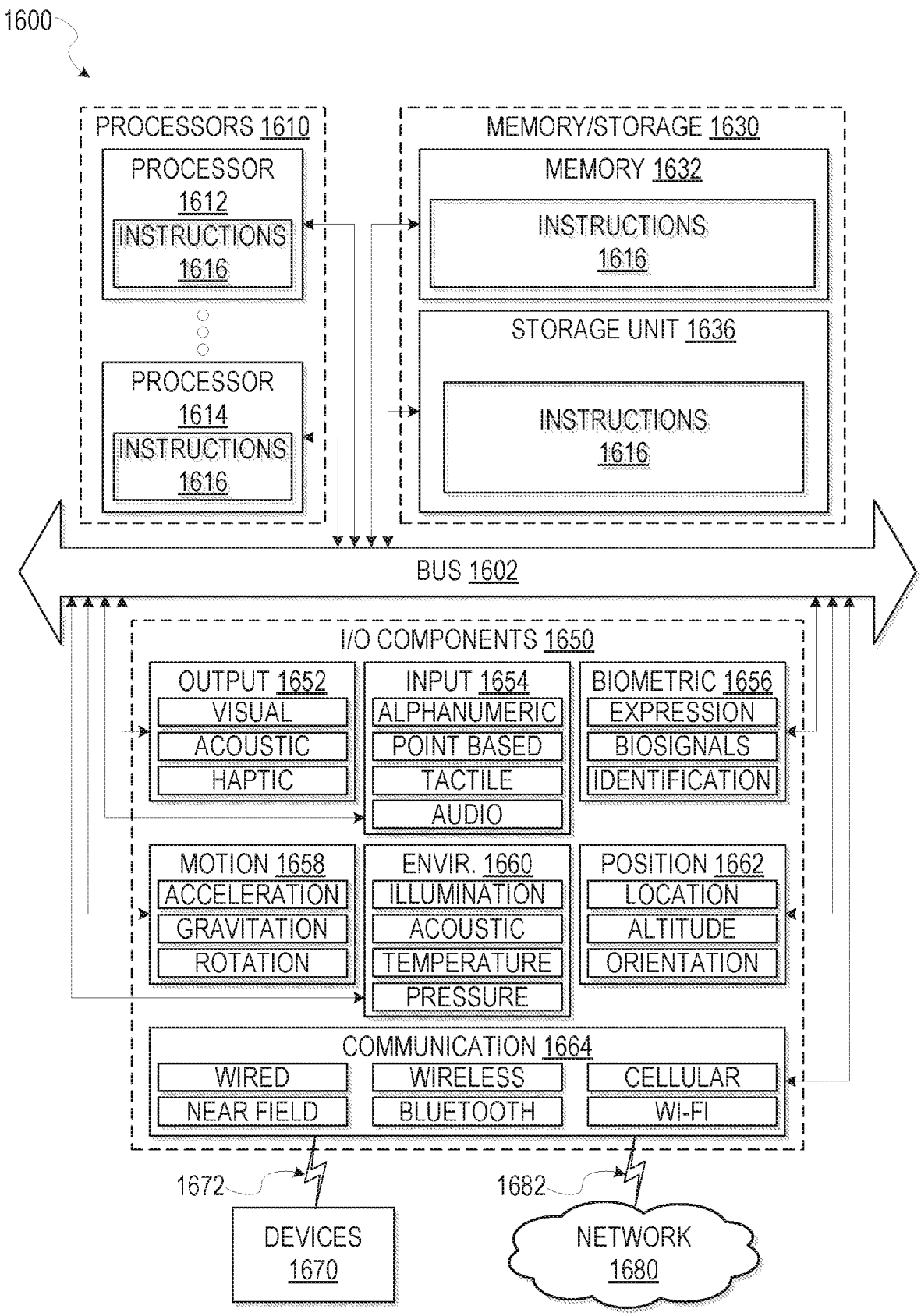
FIG. 16 illustrates a diagrammatic representation of a machine in the form of a computer system within which a set of instructions may be executed for causing the machine to perform any one or more of the methodologies discussed herein, according to an example embodiment.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example the instructions may cause the machine to execute the flow diagrams of FIGS. 11-14. Additionally, or alternatively, the instructions may implement the modules shown in FIGS. 1D, 2A, 3, 4, 5A, and 5B, and so forth. The instructions transform the general, non-programmed machine into a particular machine programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory 1630, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1612 and processor 1614 that may execute instructions 1616. The term "processor" is intended to include multi-core processor that may comprise two or more independent processors (sometimes referred to as "cores") that may execute instructions contemporaneously. Although FIG. 16 shows multiple processors, the machine 1600 may include a single processor with a single core, a single processor with multiple cores (e.g., a multi-core process), multiple processors with a single core, multiple processors with multiples cores, or any combination thereof.

The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor's cache memory), or any suitable combination thereof, during execution thereof by the machine 1600. Accordingly, the memory 1632, the storage unit 1636, and the memory of processors 1610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via coupling 1682 and coupling 1672 respectively. For example, the communication components 1664 may include a network interface component or other suitable device to interface with the network 1680. In further examples, communication components 1664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a Universal Serial Bus (USB)).

Moreover, the communication components 1664 may detect identifiers or include components operable to detect identifiers. For example, the communication components 1664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1664, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or other type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., hypertext transfer protocol (HTTP)). Similarly, the instructions 1616 may be transmitted or received using a transmission medium via the coupling 1672 (e.g., a peer-to-peer coupling) to devices 1670. The term "transmission medium" shall be taken to include any intangible medium that is capable of storing, encoding, or carrying instructions 1616 for execution by the machine 1600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving a query by a runtime system;
identifying matching item listings for the query from a database storing item listings;
identifying query terms from the query;
retrieving a query feature score associated with each query term from the query, the query feature score for each query term generated using historical search information for previous queries containing the query term;
computing, using a processor of a machine, an inferred query feature score for the query based on the query feature scores for the query terms from the query;
generating a ranking for each matching item listing using the inferred query feature score for the query; and
providing, based on the rankings, at least a portion of the matching item listings as search results in response to the query.

2. The method of claim 1, wherein the query feature scores for the query terms from the query are retrieved from a dictionary, the method further comprising:
computing, using an offline system, the dictionary based on the historical search information, the dictionary being indexed by queries.

3. The method of claim 1, wherein the query feature scores for the query terms from the query are retrieved from a dictionary, the method further comprising:
receiving by the runtime system, updates to the dictionary, the updates representing tuples, each tuple comprising category, query term, and category-query term affinity.

4. The method of claim 3, further comprising:
reducing a size of the dictionary by removing tuples based on an information-theoretic measure of affinities.

5. The method of claim 2, further comprising:
storing a copy of the dictionary in a second database, the second database accessible during runtime by the runtime system.

6. The method of claim 2,
wherein the historical search information comprises user interaction data representing view items; and
wherein computing, using the offline system, the dictionary based on the historical search information comprises:
determining view item counts for query-category pairs;
determining view item counts for query term-category pairs by aggregating the view item counts for the query-category pairs based on query terms included in the query-category pairs;

determining total view item counts per query term by aggregating the view item counts for the query term-category pairs across relevant categories; and determining the query feature scores based on the view item counts for the query-category pairs and the total view item counts per query term.

7. The method of claim 2, wherein the historical search information includes user interaction data that comprises one or more selected from the following: view items, buy items, watch items, and bid items.

8. The method of claim 6, wherein determining the query feature scores based on the view item counts for the query-category pairs and the total view item counts per query term comprises:

determining a first query feature score for a first query term based on a conditional probability.

9. The method of claim 1, wherein generating the ranking for each matching item listing using the inferred query feature score for the query comprises:

providing the inferred query score to a machine learning algorithm to compute a machined learned ranking score for each matching item listing; and computing the ranking for each matching item listing using the machine learned ranking score for each matching item listing.

10. The method of claim 1, further comprising:

determining the query is not associated with a predetermined query feature score stored in a dictionary.

11. The method of claim 1, wherein computing, using the processor of the machine, the inferred query feature score for the query comprises:

determining a total number of tokens for the query;

evaluating the query to identify the query terms as bigrams and unigrams;

identifying which of the bigrams and the unigrams are associated with a query feature score in a dictionary;

based on a number of the bigrams and the unigrams associated with a query feature score in the dictionary, determining a number of tokens associated with a query feature score and a number of tokens missing a query feature score; and computing the inferred query feature score based on query feature scores associated with the bigrams or the unigrams, the number of tokens associated with a query feature score, and the number of tokens missing a query feature score.

12. A runtime system comprising:

a memory device for storing instructions; and a processor, which, when executing the instructions, causes the runtime system to perform operations comprising:

receiving a query;

identifying matching item listings for the query from a database storing item listings;

retrieving assigned probabilities for each query term from a plurality of query terms from the query, the assigned probability for each query term based on a probability model for a query feature using historical search information for previous queries containing the query term;

computing an inferred score for the query feature based on the assigned probabilities for the query terms;

providing the inferred score to at last one machine learning module to generate a ranking score for each matching item listing; and providing, based on the ranking scores, at least a portion of the matching item listings as search results in response to the query.

13. The runtime system of claim 12, wherein the query feature represents a category demand for the query.

14. The runtime system of claim 13, wherein the probability model for the category demand represents a model for each category over the query terms for the query.

15. The runtime system of claim 14, wherein the query terms from the query comprise one or more unigrams, bigrams, and/or trigrams from the query.

16. The runtime system of claim 13, wherein the assigned probability for each query term represents a category-query term affinity indicating a measure of strength between the query term and a category.

17. A non-transitory machine-readable storage medium in communication with at least one processor, the machine-readable storage medium storing instructions which, when executed by the at least one processor, performs operations comprising:

receiving a query;

identifying matching item listings for the query from a database storing item listings;

retrieving assigned probabilities for each query term from a plurality of query terms from the query, the assigned probability for each query term based on a probability model for a query feature using historical search information for previous queries containing the query term;

computing an inferred score for the query feature based on the assigned probabilities for the query terms;

providing the inferred score to at last one machine learning module to generate a ranking score for each matching item listing; and providing, based on the ranking scores, at least a portion of the matching item listings as search results in response to the query.

\* \* \* \* \*